US012647261B2

(12) United States Patent 
Ranellucci et al.

(10) Patent No.: US 12,647,261 B2 
(45) Date of Patent: Jun. 2, 2026

(54) VERIFIER GENERATED COMMON REFERENCE STRING FOR ZERO-KNOWLEDGE PROOFS

(71) Applicant: Coinbase, Inc., Oakland, CA (US)

(72) Inventors: Samuel Ranellucci, Montreal (CA); Iftach Haitner, Ramat Hasharon (IL)

( * ) Notice: Subject to any disclaimer, the term of this patent is extended or adjusted under 35 U.S.C. 154(b) by 187 days.

(21) Appl. No.: 18/388,774

(22) Filed: Nov. 10, 2023

(65) Prior Publication Data

US 2025/0158810 A1 May 15, 2025

(51) Int. Cl. 
*H04L 9/08* (2006.01) 
*H04L 9/32* (2006.01)

(52) U.S. Cl. 
CPC .......... *H04L 9/0869* (2013.01); *H04L 9/3247* (2013.01)

(58) Field of Classification Search 
None 
See application file for complete search history.

(56) References Cited

U.S. PATENT DOCUMENTS

| | | | |
|---|---|---|---|
| 2021/0028939 A1* | 1/2021 | Trevethan | ............ G06Q 20/401 |
| 2023/0186293 A1* | 6/2023 | Dolev | ................... H04L 9/0869 |
| | | | 705/75 |
| 2024/0396735 A1 | 11/2024 | Mukherjee et al. | |
| 2025/0158828 A1 | 5/2025 | Ranellucci et al. | |

* cited by examiner

*Primary Examiner* — William J. Goodchild 
(74) *Attorney, Agent, or Firm* — Holland & Hart LLP

(57) ABSTRACT

Methods, systems, and devices for data management are described. A verifier node may generate a common reference string (CRS) using a random value. The verifier node may transmit a message including the CRS to a prover node. The prover node may execute a zero-knowledge proof (ZKP) using the CRS and transmit, to the verifier node, a commitment of an output of the ZKP. The commitment of the output may be configured to hide the output from the verifier node until the output is revealed to the verifier node. The verifier node may transmit the random value. The prover node may determine whether the CRS is generated using the random value from the verifier node and either abort the cryptographic operation or reveal the commitment. The verifier node may verify that the output is a valid ZKP if the prover node reveals the commitment.

20 Claims, 13 Drawing Sheets

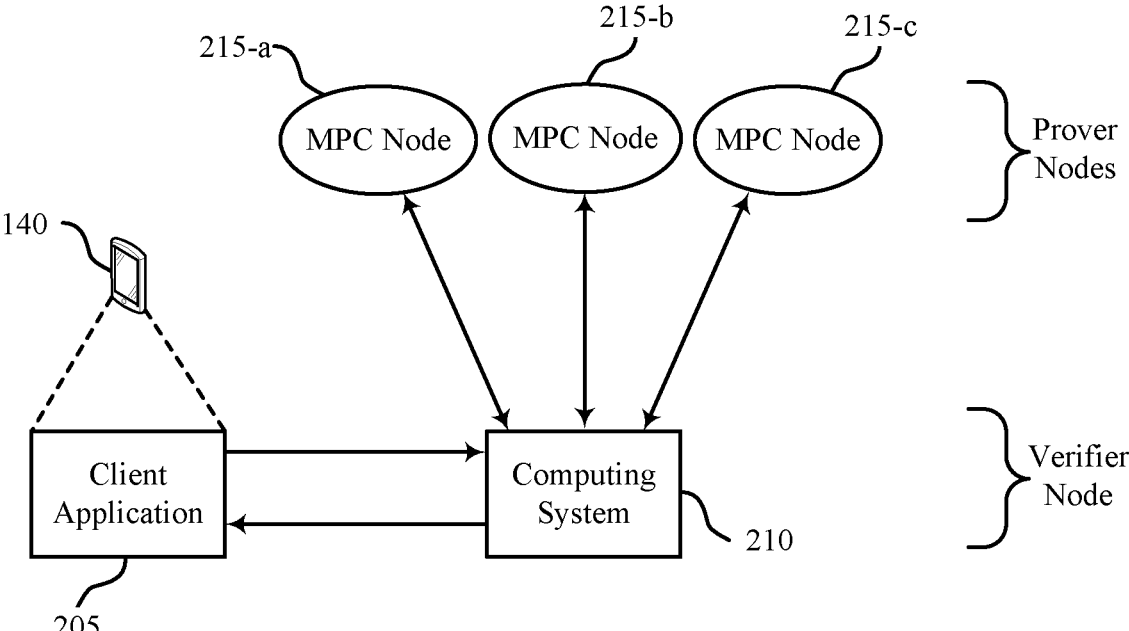
215-a    215-b    215-c
MPC Node    MPC Node    MPC Node
Prover
Nodes
140
Client
Application
Computing
System
Verifier
Node
205
210
200
FIG. 2

Figure 4:
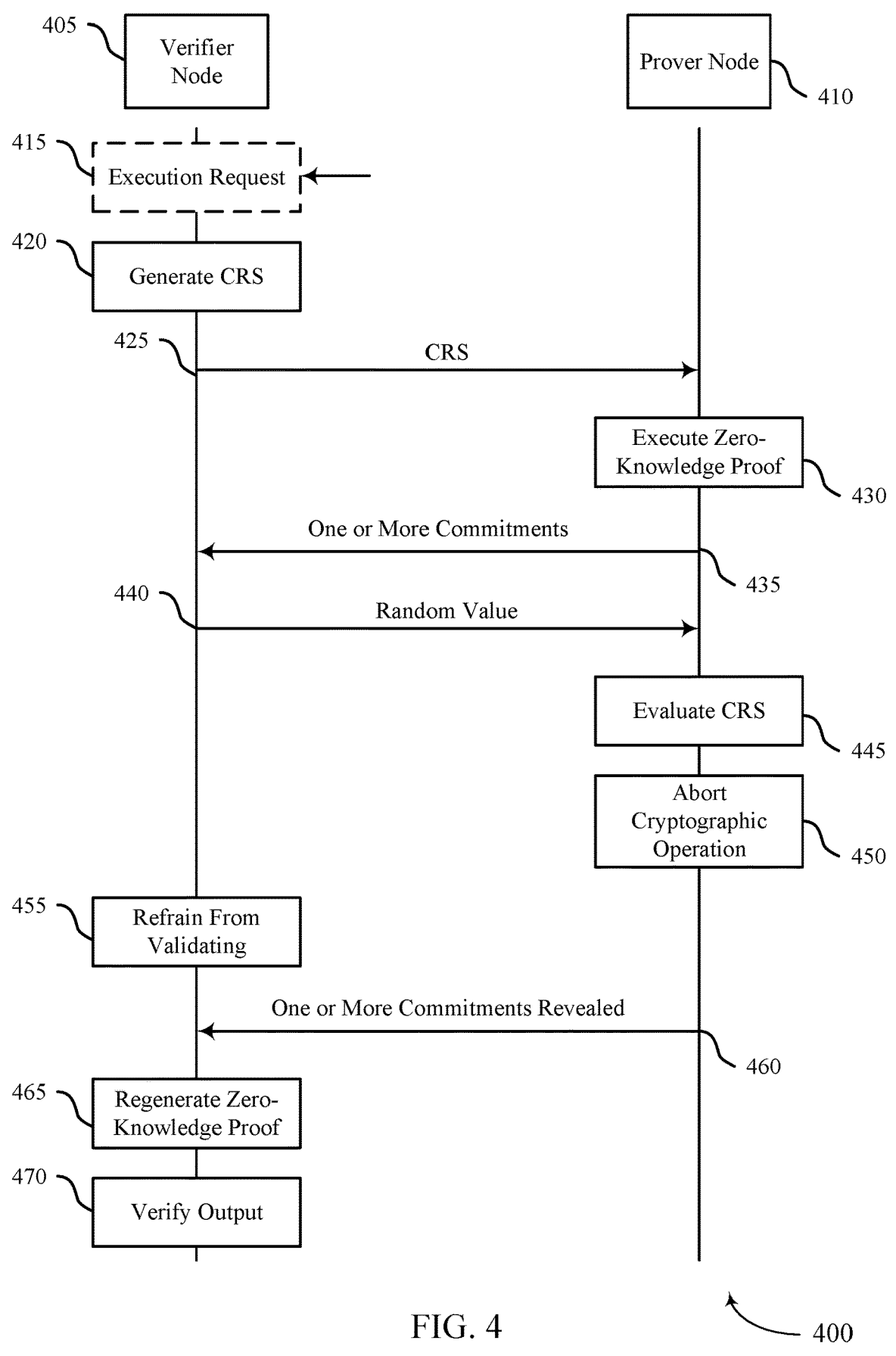

405 — Verifier Node

410 — Prover Node

415 — Execution Request

420 — Generate CRS

425 — CRS

430 — Execute Zero-Knowledge Proof

435 — One or More Commitments

440 — Random Value

445 — Evaluate CRS

450 — Abort Cryptographic Operation

455 — Refrain From Validating

460 — One or More Commitments Revealed

465 — Regenerate Zero-Knowledge Proof

470 — Verify Output

CRS Generator

625

Zero-Knowledge Proof Component

635

Commitment Receiver

645

Execution Request Receiver

655

CRS Transmitter

630

Random Value Transmitter

640

Verification Component

650

620

600

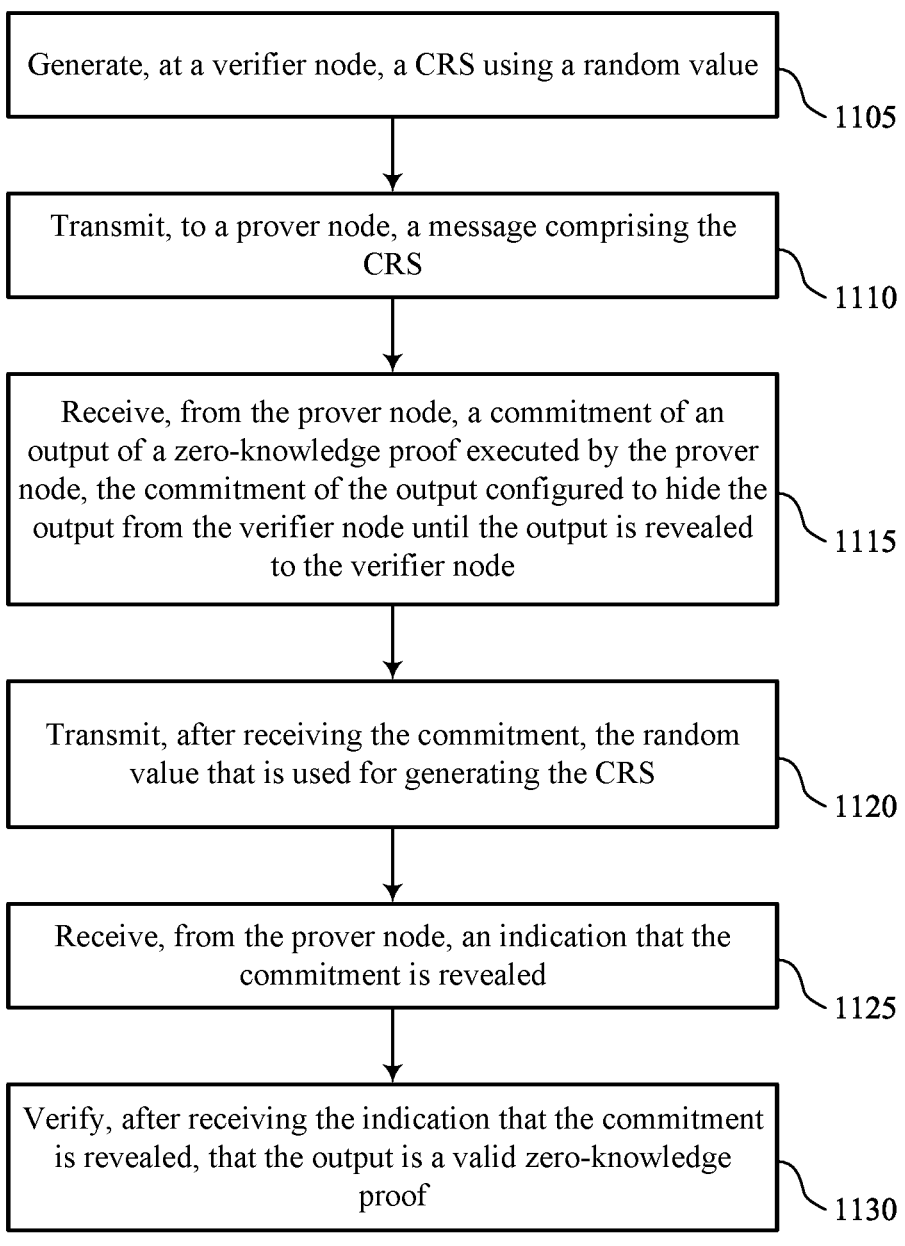

Generate, at a verifier node, a CRS using a random value

1105

Transmit, to a prover node, a message comprising the CRS

1110

Receive, from the prover node, a commitment of an output of a zero-knowledge proof executed by the prover node, the commitment of the output configured to hide the output from the verifier node until the output is revealed to the verifier node

1115

Transmit, after receiving the commitment, the random value that is used for generating the CRS

1120

Receive, from the prover node, an indication that the commitment is revealed

1125

Verify, after receiving the indication that the commitment is revealed, that the output is a valid zero-knowledge proof

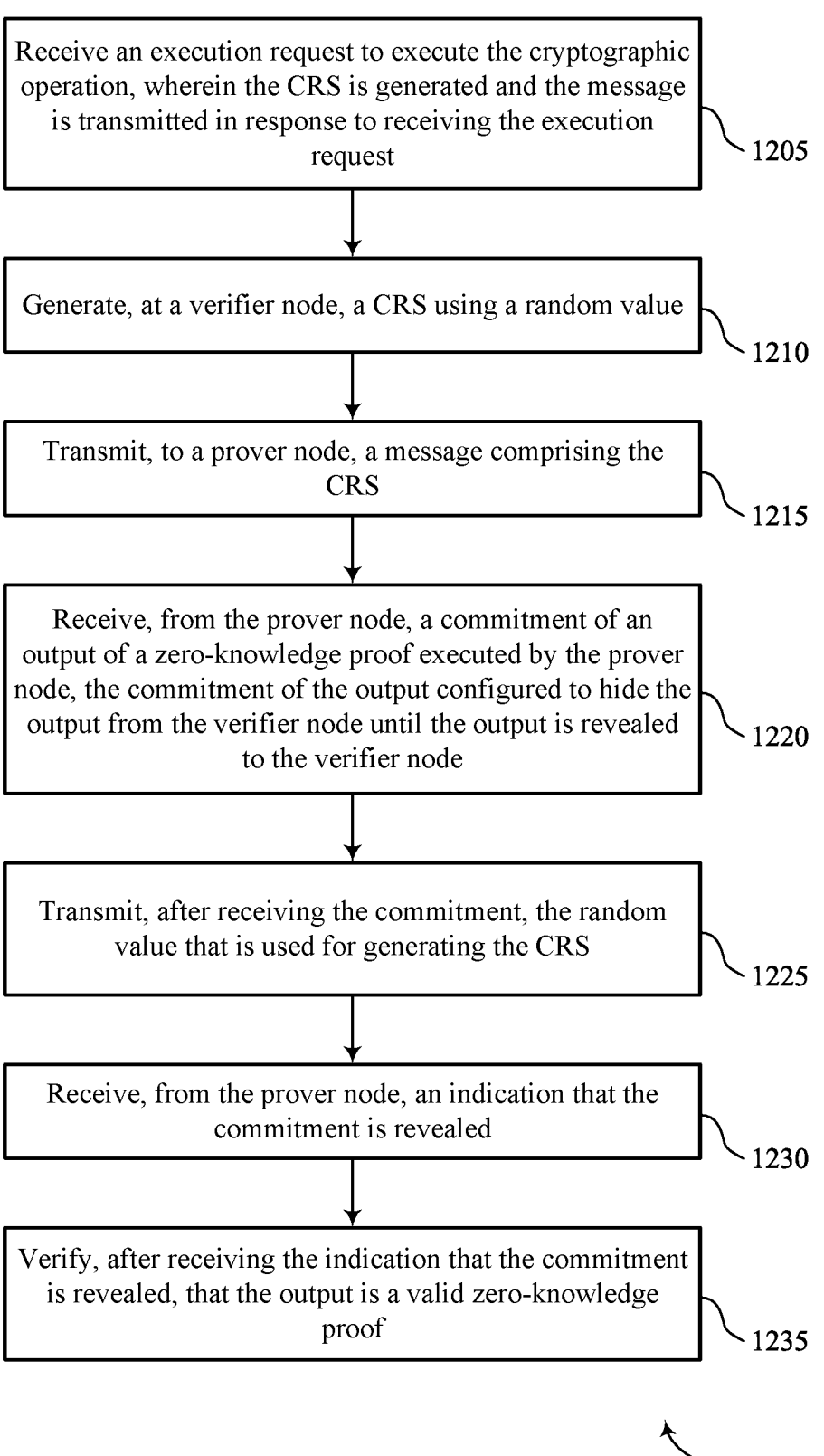

Receive an execution request to execute the cryptographic operation, wherein the CRS is generated and the message is transmitted in response to receiving the execution request

1205

Generate, at a verifier node, a CRS using a random value

1210

Transmit, to a prover node, a message comprising the CRS

1215

Receive, from the prover node, a commitment of an output of a zero-knowledge proof executed by the prover node, the commitment of the output configured to hide the output from the verifier node until the output is revealed to the verifier node

1220

Transmit, after receiving the commitment, the random value that is used for generating the CRS

1225

Receive, from the prover node, an indication that the commitment is revealed

1230

Verify, after receiving the indication that the commitment is revealed, that the output is a valid zero-knowledge proof

VERIFIER GENERATED COMMON REFERENCE STRING FOR ZERO-KNOWLEDGE PROOFS

FIELD OF TECHNOLOGY

The present disclosure relates generally to data management, including techniques for verifier generated common reference string (CRS) for non-interactive zero-knowledge proofs.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIG. 2 shows an example of a computing environment that supports verifier generated CRS for zero-knowledge proofs in accordance with aspects of the present disclosure.

FIGS. 3 and 4 show examples of process flows that support verifier generated CRS for zero-knowledge proofs in accordance with aspects of the present disclosure.

FIGS. 11 through 13 show flowcharts illustrating methods that support verifier generated CRS for zero-knowledge proofs in accordance with aspects of the present disclosure.

DETAILED DESCRIPTION

Figure 1:
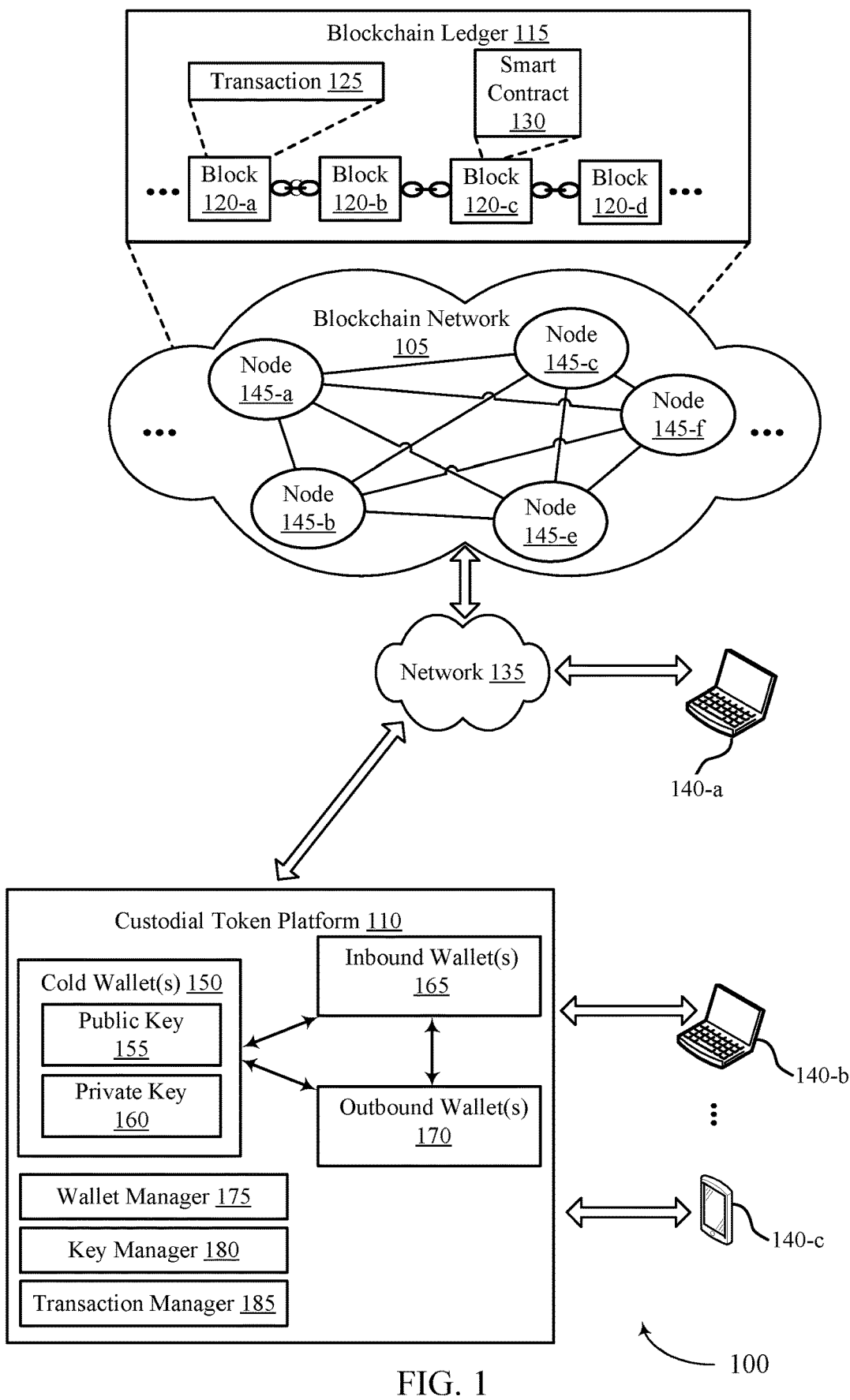
FIG. 1 illustrates an example of a computing environment that supports verifier generated common reference string (CRS) for zero-knowledge proofs in accordance with aspects of the present disclosure.

Zero-knowledge proofs (e.g., zk-proofs) are cryptographic methods that may be used in a variety of applications, and zero-knowledge proofs may be used by a party (e.g., a prover) to prove to another party (e.g., the verifier) that a given statement is true without revealing additional information. Example applications include authentication systems and blockchain networks. For example, in the case of blockchain networks, zero-knowledge proofs may be used to verify contents of transactions without revealing the transaction data. Zero-knowledge proofs may also be used in multi-party computations (MPCs) to support secure computation (e.g., signatures) without revealing the inputs to each node. For example, a threshold signature scheme (TSS) may utilize a zero-knowledge proof to execute or validate an operation. In such cases, a secret may be split into multiple (e.g., two or more) parts and distributed to multiple nodes. A threshold quantity of nodes may use the secret value to execute an operation. For example, the threshold quantity of nodes, which may be less than a total quantity of nodes having the parts, may be required to execute the operation. The threshold quantity of nodes may execute the operation without revealing the secret. In the example of a cryptographic operation, such as a cryptographic signature or a cryptographic transaction, a cryptographic key share (e.g., a key share of a private key) may be distributed to multiple MPC nodes, where a threshold quantity of MPC nodes may execute the cryptographic operation using the respective key shares. In some cases, a key management system may distribute the cryptographic key to the MPC nodes using MPC operations.

In order to verify an operation, such as the cryptographic operation, a verifier node and a prover node (e.g., one or more of the MPC nodes) may execute a zero-knowledge proof. The zero-knowledge proof may enable the verifier node to confirm the operation as correct while not revealing the secret (e.g., the cryptographic key or key share). That is, the verifier node may confirm the operation without revealing the secret used by the threshold quantity of nodes to perform the operation.

In some cases, performance of the zero-knowledge proof may be associated with large power or computational resource consumption for the verifier node, the prover node, or both. Additionally, or alternatively, the zero-knowledge proof may involve generation of a common reference string (CRS). For example, the verifier node and the prover node may share some information (e.g., a shared key), such as the CRS, based on which the prover node may generate and the verifier node may verify the zero-knowledge proof. In some examples, the verifier node may manipulate the CRS such that the result of the verification is inaccurate or such that the verifier may obtain secret information. As such, a CRS may be generated by a trusted third party, but utilization of a trusted third party may require a trusted setup, which may be computationally expensive. Additionally, or alternatively, zero-knowledge proofs may be associated with a quantity of communications between the verifier node and the prover node, and such communications may be computing resource intensive.

As described herein, the verifier node and the prover node may communicate to manage an operation, such as the cryptographic operation, using a zero-knowledge proof and generation of a CRS by a verifier node. The techniques described herein may be applicable to both non-interactive zero-knowledge (e.g., NIZK) proofs and public-coin zero knowledge proofs and may leverage commitment schemes such that the verifier is able to generate and use a CRS while avoiding scenarios where a verifier may "cheat" and obtain information. For example, according to the techniques described herein, the verifier node may generate a CRS using a random value (e.g., a random value r). In some examples, the random value r may represent a seed value. The verifier node may transmit a message including the CRS to the prover node. For example, the verifier node may transmit the CRS to the prover node to support the zero-knowledge proof associated with a cryptographic operation, such as the TSS procedure. The prover node may execute the zero-knowledge proof using the CRS. For example, the prover node may use an algorithm to compute the zero-knowledge proof using the CRS. The prover node may commit (e.g., using a commitment scheme) an output of the zero-knowledge proof. For example, the commitment scheme may be configured to hide the output from the verifier node until the output is revealed to the verifier node. The prover node may commit the output such that the output is binding (e.g., cannot be changed). In some examples, the prover node may transmit multiple commitments to the verifier node.

To support verification of the CRS, the validator node may transmit an indication of the random value (e.g., the seed) associated with the CRS to the prover node. The prover node may check whether the CRS was generated accurately by determining whether the CRS is generated using the random value. Based on the determining, the prover node may abort the operation or reveal the commitment. For example, the prover node may abort the operation based on determining that the CRS is not generated from the random value. Or, the prover node may reveal the commitment (e.g., revealing the output of the zero-knowledge proof) based on determining that the CRS is generated from the random value. The verifier node may verify that the output (e.g., the output revealed from the commitment) is a valid zero-knowledge proof. In some examples, the verifier node may verify the multiple commitments. For example, the multiple commitments may be associated with steps of the zero-knowledge proof. The verifier node may verify the proof at each step based on receiving the opened commitments.

The verifier node and the prover node may reduce a total quantity of communications and a total amount of time to setup and/or complete the zero-knowledge proof by using the commitment scheme. The verifier node and the prover node may execute the zero-knowledge proof to execute the cryptographic operation without assuming that the other node is "trusted." That is, the verifier node and the prover node may rely on the commitment scheme and the zero-knowledge proof (e.g., non-interactive zero-knowledge proof or public coin zero-knowledge proof) to verify that the outputs of each node are correct.

FIG. 1 illustrates an example of a computing environment 100 that supports verifier generated CRS for zero-knowledge proofs in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-a may provide user inputs via the computing device 140-a, which may result in commands, data, or any combination thereof being communicated via the network 135 to the custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170) may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

Various aspects of the computing environment 100 may implement zero-knowledge proofs for various functionality. For example, the nodes 145 of the blockchain network 105 may implement zero-knowledge proofs to verify transactions without revealing contents of the transactions. In some examples, zero-knowledge proofs may be used to control MPC wallets for interaction with the blockchain ledger 115 via the blockchain network. For example, an internal wallet (e.g., the cold wallet 150) of the custodial token platform 110 may be controlled via MPC functionality, such that multiple parties may be required to sign a transaction before the transaction is broadcast via the blockchain network 105 to transfer crypto tokens from the cold wallet 150. In such cases, respective key shares of a secret (e.g., the private key 160) may be distributed to each of the MPC nodes to support MPC signing. In some cases, the MPC functionality may enforce a threshold signing protocol whereby m of n MPC nodes are required to sign before a transaction is broadcast and verified. The MPC nodes may implement zero-knowledge proofs to support the threshold signing protocol. It should be noted that the MPC and zero-knowledge proof techniques described herein may be applicable to contexts outside of blockchain network interaction.

To support improved and efficient zero-knowledge proof, a verifier node may be configured to generate a CRS for a zero-knowledge proof and utilize a commitment scheme to implement the zero-knowledge proof. A verifier node, which may be an example of aspects of the custodial token platform 110, the network 135, or the computing devices 140, may generate a CRS using a random value. The verifier node may transmit a message including the CRS to a prover node, which may be an example of an MPC node (e.g., controlled or accessed by the custodial token platform 110). For example, the prover node may be one of multiple MPC nodes having parts of a secret value, such as parts of the private key 160. In some examples, the verifier node may generate and transmit the CRS to verify an operation performed by a subset of the MPC nodes having the parts of the secret value. For example, the MPC nodes may collaborate (e.g., via a TSS) to perform one or more cryptographic operations using a threshold quantity of the parts of the secret value.

The prover node may execute a zero-knowledge proof using the CRS and transmit, to the verifier node, a commitment of an output of the zero-knowledge proof. The commitment of the output may be configured to hide the output from the verifier node until the output is revealed to the verifier node. For example, the prover node may not be able to change the output (e.g., cheat) based on a commitment scheme. In some examples, the prover node may transmit multiple commitments corresponding to a transcript of the zero-knowledge proof.

The verifier node may transmit the random value to the prover node. The prover node may determine whether the CRS is generated using the random value from the verifier node and either abort the cryptographic operation (e.g., based on determining that the CRS is not generated from the random value) or reveal the commitment (e.g., based on determining that the CRS is generated from the random value). The verifier node may verify that the output is a valid zero-knowledge proof if the prover node reveals the commitment (e.g., reveals the output of the zero-knowledge proof). In some examples, the verifier node may verify that the multiple commitments corresponding to the transcript of the zero-knowledge proof are valid. For example, the verifier node may reject the proof based on detecting a first invalid step.

Thus, the custodial token platform 110 or other aspects of the computing environment 100 may implement the zero-knowledge proof and commitment scheme techniques described herein to support improved and efficient MPC operations. Additionally, implementation of such MPC operations may support improved security in blockchain wallet management, among other benefits.

FIG. 2 shows an example of a computing environment 200 that supports verifier generated CRS for zero-knowledge proofs in accordance with aspects of the present disclosure. The computing environment may include a computing device 140, which may be an example of corresponding devices as described with reference to FIG. 1. The computing environment 200 may also include a client application 205, which may be associated with the custodial token platform 110 as described with reference to FIG. 1.

The computing environment 200 may include the client application 205, a computing system 210, and multiple MPC nodes (e.g., an MPC node 215-a, an MPC node 215-b, and an MPC node 215-c). The MPC nodes 215 may each be associated with or may be configured with access to a respective part (e.g., share, shard, etc.) of a secret, such as a private key (e.g., the private key 160 with reference to FIG. 1). For example, the secret may be distributed such that it is not controlled by a single node.

In some examples, the computing system 210 may be associated with a key management system, such as key manager 180 of FIG. 1, and the computing system 210 may be configured to manage MPC operations with the MPC nodes 215. As such, the computing system 210 may be referred to as or may implement a "central coordinator." The key management system may distribute and facilitate the use of the parts of the secret at the MPC nodes 215. For example, the client application 205 may transmit a request to the computing system 210 to execute a cryptographic operation (e.g., a signature, transaction, etc.). The computing system 210 may transmit (e.g., relay) the request to execute the cryptographic operation to at least a subset of the MPC nodes 215. For example, the computing system 210 may request that two of the MPC node 215-a, the MPC node 215-b, or the MPC node 215-c execute the operation. That is, the computing system 210 may request that m MPC nodes out of n total MPC nodes execute the operation. The computing system 210 may combine (e.g., aggregate) the execution of the operation from two of the MPC node 215-a, the MPC node 215-*b*, or the MPC node 215-*c* and transmit an output to the client application 205 or otherwise output the result of the operation, such as by broadcasting a signed transaction via a blockchain network.

The distribution of parts of the secret and use of a quantity of parts (or a subset of the parts) to execute the cryptographic operation may enable the client application 205, the computing system 210, or both to execute cryptographic functions (e.g., or otherwise use the secret) without revealing the secret. Additionally, the use of the zero-knowledge proofs as described herein may support execution of cryptographic functions without revealing portions or key shares of the secret (e.g., the private key).

For example, the computing environment 200 may implement a TSS, wherein the m MPC nodes out of the n total MPC nodes execute the cryptographic operation. In some examples, the TSS may be associated with a custodial policy defining a quantity of MPC nodes, characteristics associated with the MPC nodes (e.g., geographic location, a datacenter type, whether the MPC node is human operated or AI operated, etc.), or the like. For example, the custodial policy may be defined via one or more Boolean rules.

In the context of FIG. 2, the computing system 210, or various aspects thereof, may be referred to as a verifier node in implementing the zero-knowledge proof techniques described herein. Additionally, each MPC node 215 may be an example of a prover node 215 in implementing the zero-knowledge proof techniques described herein. After the verifier node (e.g., the computing system 210) verifies the execution of the cryptographic operation by one or more of the MPC nodes 215 (e.g., by verifying zero-knowledge proofs executed by one or more of the MPC Nodes 215), the computing system 210 may broadcast the executed output (e.g., the signed transaction) to the blockchain.

As described herein, the verifier node (e.g., the computing system 210) may use zero-knowledge proofs to execute and verify the cryptographic operation (e.g., digital signature). For example, the verifier node may use the zero-knowledge proof to verify the output without revealing the secret (e.g., distributed to the MPC nodes 215) or parts of the secret (e.g., at respective MPC nodes 215).

A zero-knowledge proof may be associated with a set of properties including completeness, soundness, and zero-knowledge. Completeness means that if a statement is true, then the prover can convince the verifier that the statement is true. Soundness means that if a statement is false, then the prover cannot convince the verifier that the statement is true. Zero-knowledge mans that the verifier does not learn any information about the proof. Various types of zero-knowledge proofs may be implemented, including a non-interactive zero-knowledge proof and a public-coin zero-knowledge proof. A non-interactive zero-knowledge proof requires no interaction between the prover and the verifier beyond a single message from the prover to the verifier. A public-coin zero knowledge proof may be a zero-knowledge proof where the messages from the prover to the verifier includes only random messages. In other words, the messages sent by the verifier are equivalent to flipping random coins. Many zero-knowledge proofs may require the use of a CRS that supports completeness, soundness, or a zero-knowledge property. A CRS may be generated by a trusted third party.

As described herein, a commitment scheme may be used to support generation of the CRS by the verifier to support zero-knowledge proofs. A commitment scheme may be a primitive that involves a sender and a receiver and allows the sender to commit a chosen value or statement while keeping it hidden from the receiver, with the ability to reveal the committed value or statement later. These schemes may be designed so that a party cannot change the value or statement after the value or statement is committed. As analogy, in a commit phase of the commitment scheme, the sender may put a message of his choice in a safe and give the safe to the receiver. We say that the sender has committed to the message. In the open phase, the sender may reveal the combination of the safe to the receiver and the receiver may open the safe and obtain the message, and it may be said that the sender has opened the commitment. The procedure has two properties:

(1) hiding: before the open phase, the receiver has no information about the message since the receiver does not know the combination to open the safe and the message is safely hidden in the safe (2) binding: the sender cannot change the message inside the safe since the safe has been given to the receiver.

As noted herein, utilization of a CRS generated by a trusted third party may require additional computation and coordination complexities. Techniques described herein support the utilization of zero-knowledge proofs with a CRS without using a trusted setup.

The techniques described herein are described with respect to the verifier being the computing system 210 and the prover being one of the MPC nodes 215 to facilitate execution of an MPC cryptographic operation (e.g., threshold signing), but it should be understood that these techniques may be applicable in other contexts. In the context of FIG. 2, the verifier node (e.g., the computing system 210) may communicate with one of the prover node (e.g., one of the MPC nodes 215-*a*) to perform the zero-knowledge proof techniques described herein.

The verifier node, to perform the zero-knowledge proof, may generate a CRS from a random value r. In some examples, the verifier node may generate the CRS dishonestly (e.g., to gain information about the prover node). As described herein, the prover node may verify that the CRS is generated accurately.

For example, the verifier node may transmit the CRS to the prover node. The prover node may generate an output of the zero-knowledge proof and commit the output according to a commitment scheme. For example, the commitment scheme may enable the prover node to send the commitment to the verifier node without revealing the commitment. In some examples, the prover node may transmit an encrypted value as a commitment such that the verifier node may not decrypt the commitment until receiving secret information (e.g., a value and some randomness and/or key), such as a decryption scheme (e.g., a decryption technique and/or key). For example, the prover node may reveal the secret information to the verifier node based on determining that the CRS is generated accurately. Additionally, or alternatively, the prover node may transmit the value (e.g., a decrypted value rather than the decryption scheme) to the verifier node.

In some examples, the verifier node may commit multiple outputs of the zero-knowledge proof. For example, the zero-knowledge proof may include a set of operations at which the prover node may transmit outputs to the verifier node. The prover node and the validator node may transmit and verify individual operations of the zero-knowledge proof (e.g., outputs), or, the prover node and the validator node may transmit and verify a transcript of the zero-knowledge proof (e.g., a result).

For example, the prover node may commit the outputs at each step of the zero-knowledge proof. The verifier node may refrain from sending r to the prover (e.g., to verify the CRS) until the prover node commits the entire zero-knowledge proof.

The verifier node may, based on receiving the commitment or the multiple commitments, transmit an indication of the random value r used to generate the CRS to the prover node. The prover node may determine whether the CRS is generated from r. For example, the prover node may abort the cryptographic based on determining that the CRS is not generated from r. Or, the prover node may open the commitment (e.g., by transmitting the decryption scheme to the verifier node). The verifier node may verify whether the output of the zero-knowledge proof from the commitment is a valid zero-knowledge proof based on the commitment being opened.

In some examples, the verifier node may verify whether each output from the multiple commitments are valid. For example, the verifier node may regenerate a transcript of the zero-knowledge proof including each output and verify whether each output is valid. The verifier node may reject, at any step while reviewing the transcript, the zero-knowledge proof. For example, the verifier node may determine that a first output of the zero-knowledge proof is invalid and reject the zero-knowledge proof.

Thus, the following is example of a non-interactive zero knowledge proof that remains zero-knowledge even if the randomness used to generate the CRS is revealed to the verifier. This illustrates that non-interactive zero-knowledge proof can be converted to a zero-knowledge proof where the CRS can be generated by the verifier:

1) Verifier
   a) Samples randomness r
   b) Generates CRS from r
   c) Sends CRS to Prover
2) Prover generates the zk-proof using the CRS and commits to it (using the commitment scheme).
3) Verifier sends r to the prover.
4) Prover
   a) Aborts if CRS is not generated from r
   b) Opens the commitment if the CRS is generated from r.
5) Verifier checks that the opened message is a valid zero-knowledge proof.

Additionally, the following is an example of a public-coin zero-knowledge proof that remains zero-knowledge even if the randomness used to generate the CRS is revealed to the verifier:

1) Verifier
   a) Samples randomness r
   b) Generates CRS from r
   c) Sends CRS to Prover
2) Prover and verifier execute the zk-proof with the following notable modifications
   a) Whenever the prover would send a message in the zk-proof, instead the prover commits the message that would have been sent.
   b) Verifier does not execute any of the validation steps (until later).
3) Verifier sends r to the prover.
4) Prover
   a) Aborts if CRS is not generated from r
   b) Opens the commitments.
5) Verifier regenerates the transcript of the zk-proof and checks if the verifier of the original zk-proof would have rejected the proof at any step. If yes, the verifier rejects the proof. Otherwise, the verifier accepts the proof.

As described herein, the zero-knowledge proof may be performed between the computing system 210 and the MPC node 215, and the zero-knowledge proof may be executed between the computing system 210 and multiple MPC nodes 215 as part of a MPC operation (e.g., threshold signing). After the proof is performed between the requisite number of nodes, the computing system 210 or an associated system may transmit a result of the cryptographic operation (e.g., a signed payload). In some examples, the computing system 210 or an associated system may broadcast a signed message via a blockchain network such as to facilitate transfer of crypto tokens or another blockchain operation (e.g., smart contract interaction).

Figure 3:
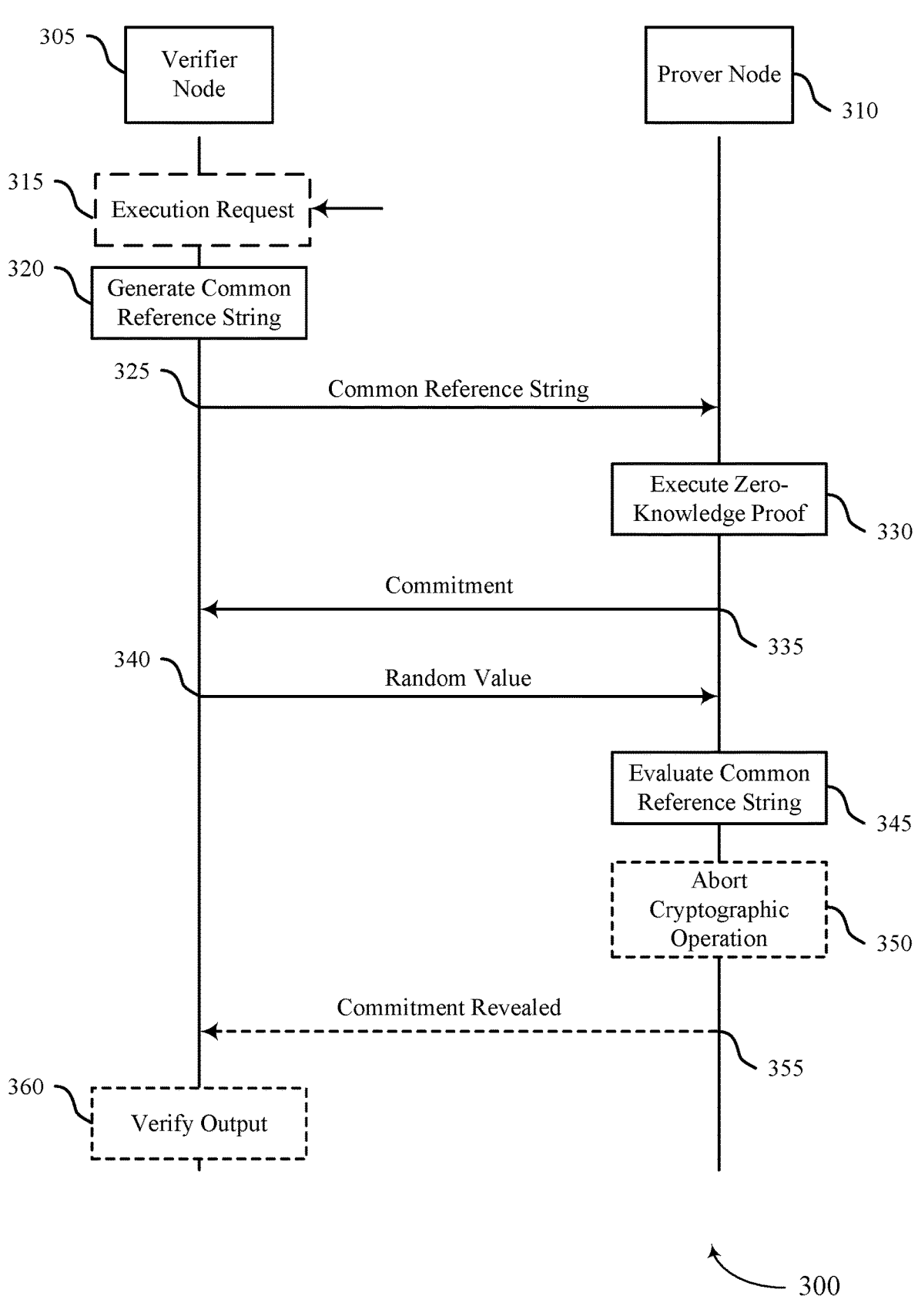

FIG. 3 shows an example of a process flow 300 that supports verifier generated CRS for zero-knowledge proofs in accordance with aspects of the present disclosure. The process flow 300 may include a verifier node 305 and a prover node 310. The verifier node 305 may be an example of aspects of the computing system 210 described with respect to FIG. 2. The prover node 310 may be an example of an MPC node 215 as described with respect to FIG. 2. The process flow 300 is an example of a non-interactive zero-knowledge proof in accordance with the techniques described herein.

In the following description of the process flow 300, the operations between the verifier node 305 and the prover node 310 may be transmitted in a different order than the example order shown, or the operations performed may be performed in different orders or at different times. Some operations may also be omitted from the process flow 300, and other operations may be added to the process flow 300.

The verifier node 305 and the prover node 310 may perform a zero-knowledge proof to execute a cryptographic operation performed (at least partially) at the prover node 310. For example, the prover node 310 may be one of multiple MPC nodes. The MPC nodes may perform cryptographic operations according to a TSS, where a threshold quantity of the MPC nodes use parts of a secret to perform cryptographic operations (e.g., signatures, transactions) without revealing the secret. For example, the verifier node 305 may perform the steps of the process flow 300 with one or more additional MPC nodes used to perform the cryptographic operation. That is, the verifier node 305 may verify individual outputs of the cryptographic operation from the MPC nodes.

At 315, the verifier node 305 may receive an execution request. For example, the verifier node 305 may receive the execution request to execute a cryptographic operation. In some examples, the cryptographic operation may be a distributed signature to be executed by a set of MPC nodes including the prover node 310. In some examples, the verifier node 305 may receive the execution request from a central coordinator (e.g., the computing system 210 as described with reference to FIG. 2) associated with multiple MPC nodes including the prover node 310.

For example, the distributed signature may include a threshold quantity of partial signatures by the set of MPC nodes. For example, the set of MPC nodes may execute the signature according to a TSS where m of n MPC nodes provide partial signatures to generate the distributed signature.

At 320, the verifier node 305 may generate a CRS. For example, the verifier node 305 may generate the CRS using a random value r. In some examples, the verifier node 305 may generate the CRS based on receiving the request to execute the cryptographic operation at 315. Additionally, or alternatively, the verifier node 305 may generate the random value based on a pseudo-random generator. For example, the verifier node 305 may generate the CRS based on a short value, such as a seed.

At 325, the verifier node 305 may transmit the CRS to the prover node 310. For example, the verifier node 305 may transmit a message to the prover node 310 including the CRS. In some examples, the prover node 310 may be one of the set of MPC nodes. The verifier node 305 may transmit the CRS to the set of MPC nodes. For example, the verifier node 305 may transmit a request to execute the cryptographic operation including the CRS to the set of MPC nodes.

At 330, the prover node 310 may execute a zero-knowledge proof. For example, the prover node 310 may execute the zero-knowledge proof using the CRS. In some examples, the zero-knowledge proof may be a non-interactive zero-knowledge proof. Additionally, or alternatively, executing the zero-knowledge proof may include executing a partial signature using a key share associated with the prover node 310.

At 335, the prover node 310 may transmit an indication of a commitment to the verifier node 305. For example, the prover node 310 may transmit the commitment of an output of the zero-knowledge proof executed at 330. The commitment of the output may be configured to hide the output from the verifier node 305 until the output is revealed at the verifier node 305. In some examples, the output may be a result of execution of the zero-knowledge proof at 330 by the prover node 310. Additionally, or alternatively, the prover node 310 may encrypt the execution of the zero-knowledge proof. For example, the prover node 310 may encrypt the one or more outputs such that the verifier node may not identify the one or more outputs. That is, the prover node 310 may encrypt the one or more outputs such that they are hidden from the verifier node (e.g., until transmitting a decryption scheme or the decrypted outputs). For example, the prover node 310 may encrypt the result of execution of the zero-knowledge proof. In some examples, the output may be a result of execution of the zero-knowledge proof at 330 by the prover node 310.

At 340, the verifier node 305 may transmit the random value to the prover node 310. For example, the verifier node 305 may transmit the random value used to generate the CRS at 320.

At 345, the prover node 310 may evaluate the CRS. For example, the prover node 310 may determine whether the CRS is generated using the random value received from the verifier node at 340.

At 350, the prover node 310 may abort the cryptographic operation. For example, the prover node 310 may abort the cryptographic operation based on determining that the random value results in a value other than the CRS. That is, the prover node 310 may abort the cryptographic operation based on determining that the CRS is not generated using the random value. The prover node 310 may refrain from revealing the output of the zero-knowledge proof in the commitment based on determining that the CRS is not generated using the random value. For example, the prover node 310 may refrain from revealing information about an output of a cryptographic operation by the prover node 310 based on detecting that the CRS is generated dishonestly.

At 355, the prover node 310 may reveal the commitment to the verifier node 305. For example, the verifier node 305 may receive an indication that the commitment is revealed. The prover node 310 may reveal the commitment by transmitting an indication of a decryption scheme that may be used to decrypt the encrypted execution of the zero-knowledge proof, and the verifier node 305 may use the decryption scheme to decrypt the commitment and reveal the output of the zero-knowledge proof. Additionally, or alternatively, the prover node 310 may transmit an indication of the decrypted commitment. For example, the prover node 310 may decrypt the commitment and send the output to the verifier node 305. Revealing the commitment may involve decrypting, digital signatures, and the like such that the verifier node 305 is able to verify that commitment.

In some examples, the verifier node 305 may receive the indication based on the prover node evaluating the CRS at 345. For example, the prover node 310 may reveal the commitment based on determining that the CRS is generated using the random value at 345. The zero-knowledge proof may be valid based on the prover node 310 receiving the indication of the random value used to generate the CRS after sending the commitment to the verifier node 305 at 335.

At 360, the verifier node 305 may verify the output. For example, the verifier node 305 may verify that the output of the zero-knowledge proof output by the prover node 310 at 330 is valid. The verifier node 305 may verify the output after it is revealed at 355.

In some examples, the verifier node 305 may verify a result of the cryptographic operation based on verifying execution of the zero-knowledge proof by a threshold quantity of MPC nodes including the prover node. For example, the verifier node 305 may verify the result according to a TSS where the verifier node 305 may verify m of n MPC nodes in order to verify the cryptographic operation.

FIG. 4 shows an example of a process flow 400 that supports verifier generated CRS for public coin zero-knowledge proofs in accordance with aspects of the present disclosure. The process flow 400 may include a verifier node 405 and a prover node 410. The verifier node 405 may be an example of the computing system 210 as described with respect to FIG. 2 and the verifier node 305 as described with respect to FIG. 3. The prover node 410 may be an example of an MPC node 215 as described with respect to FIG. 2 and the prover node 310 as described with respect to FIG. 3. The process flow 400 is an example of a public coin zero-knowledge proof in accordance with the techniques described herein.

In the following description of the process flow 400, the operations between the verifier node 405 and the prover node 410 may be transmitted in a different order than the example order shown, or the operations performed may be performed in different orders or at different times. Some operations may also be omitted from the process flow 400, and other operations may be added to the process flow 400.

The verifier node 405 and the prover node 410 may perform a zero-knowledge proof to verify an output of a cryptographic operation performed (at least partially) at the prover node 410. For example, the prover node 410 may be one of multiple MPC nodes. The MPC nodes may perform cryptographic operations according to a TSS, where a threshold quantity of the MPC nodes use parts of a secret to perform cryptographic operations (e.g., signatures, transactions) without revealing the secret. For example, the verifier node 405 may perform the steps of the process flow 400 with one or more additional MPC nodes used to perform the cryptographic operation. That is, the verifier node 405 may verify individual outputs of the cryptographic operation from the MPC nodes (e.g., rather than an aggregated output of the MPC nodes).

At 415, the verifier node 405 may receive an execution request. For example, the verifier node 405 may receive an execution request to execute a cryptographic operation. In some examples, the verifier node 405 may receive the execution request from a central coordinator (e.g., the computing system 210 as described with reference to FIG. 2) associated with multiple MPC nodes including the prover node 410.

In some examples, the cryptographic operation may be a distributed signature to be executed by a set of MPC nodes including the prover node 410. For example, the distributed signature may include a threshold quantity of partial signatures by the set of MPC nodes. For example, the set of MPC nodes may execute the signature according to a TSS where m of n MPC nodes provide partial signatures to generate the distributed signature.

At 420, the verifier node 405 may generate a CRS. For example, the verifier node 405 may generate the CRS using a random value. In some examples, the verifier node 405 may generate the CRS based on receiving the request to execute the cryptographic operation at 415. Additionally, or alternatively, the verifier node 405 may select the random value based on a pseudo-random generator. For example, the verifier node 405 may generate the CRS based on a short value, such as a seed.

At 425, the verifier node 405 may transmit the CRS to the prover node 410. For example, the verifier node 405 may transmit a message to the prover node 410 including the CRS. In some examples, the prover node 410 may be one of the set of MPC nodes. The verifier node 405 may transmit the CRS to the set of MPC nodes. For example, the verifier node 405 may transmit a request to execute the cryptographic operation including the CRS to the set of MPC nodes. The verifier node 405 may transmit a request to execute the cryptographic operation to the MPC nodes, where the request includes the CRS.

At 430, the prover node 410 may execute a zero-knowledge proof. For example, the prover node 410 may execute the zero-knowledge proof using the CRS. In some examples, the zero-knowledge proof may be a public-coin zero-knowledge proof. Additionally, or alternatively, executing the zero-knowledge proof may include executing a partial signature using a key share associated with the prover node 410.

At 435, the prover node 410 may transmit an indication of one or more commitments to the verifier node 405. For example, the prover node 410 may transmit one or more commitments of one or more outputs of the zero-knowledge proof executed at 430. The one or more commitments of the one or more outputs may be configured to hide the one or more outputs from the verifier node 305 until the one or more outputs are revealed at the verifier node 405. Additionally, or alternatively, the prover node 410 may encrypt the execution of the zero-knowledge proof. For example, the prover node 410 may encrypt the one or more outputs such that the verifier node may not identify the one or more outputs. That is, the prover node 410 may encrypt the one or more outputs such that they are hidden from the verifier node (e.g., until transmitting a decryption scheme or the decrypted outputs).

In some examples, the one or more outputs may include a second message resulting from execution of the zero-knowledge proof by the prover node 410. For example, the prover node 410 may transmit the one or more commitments corresponding to the one or more outputs via one or more messages.

In some examples, the output may be a result of execution of the zero-knowledge proof at 430 by the prover node 410.

At 440, the verifier node 405 may transmit the random value to the prover node 410. For example, the verifier node 405 may transmit the random value used to generate the CRS at 420.

At 445, the prover node 410 may evaluate the CRS. For example, the prover node 410 may determine whether the CRS is generated using the random value received from the verifier node at 440.

At 450, the prover node 410 may abort the cryptographic operation. For example, the prover node 410 may abort the cryptographic operation based on determining that the random value results in a value other than the CRS. That is, the prover node 410 may abort the cryptographic operation based on determining that the CRS is not generated using the random value. The prover node 410 may refrain from revealing the output of the zero-knowledge proof in the commitment based on determining that the CRS is not generated using the random value. For example, the prover node 410 may refrain from revealing information about an output of a cryptographic operation by the prover node 410 based on detecting that the CRS is generated dishonestly.

At 455, the verifier node 405 may refrain from validating the zero-knowledge proof. For example, the verifier node 405 may refrain from validating the zero-knowledge proof until the one or more commitments are revealed. For example, the verifier node 405 may verify the output at 470 based on receiving the revealed one or more commitments at 460.

At 460, the prover node 410 may reveal the one or more commitments to the verifier node 405. For example, the verifier node 405 may receive an indication that the one or more commitments are revealed. The prover node 410 may reveal the commitment by transmitting an indication of a decryption scheme that may be used to decrypt the encrypted execution of the zero-knowledge proof. For example, the verifier node 405 may use the decryption scheme to decrypt the one or more commitments and reveal the one or more outputs of the zero-knowledge proof. Additionally, or alternatively, the prover node 410 may transmit an indication of the decrypted one or more commitments. For example, the prover node 410 may decrypt the one or more commitments and send the one or more outputs to the verifier node 405.

In some examples, the verifier node 305 may receive the indication based on the prover node evaluating the CRS at 345. For example, the prover node 310 may reveal the commitment based on determining that the CRS is generated using the random value at 345. The zero-knowledge proof may be valid based on the prover node 310 receiving the indication of the random value used to generate the CRS after sending the commitment to the verifier node 305 at 335.

At 465, the verifier node 405 may regenerate the zero-knowledge proof. For example, the verifier node 405 may regenerate the zero-knowledge proof using the CRS. In some examples, the verifier node 405 may regenerate the zero-knowledge proof as a transcript of the one or more outputs of the zero-knowledge proof.

At 470, the verifier node 405 may verify the output. For example, the verifier node 405 may verify that the output of the zero-knowledge proof output by the prover node 410 at 430 is valid. The verifier node 405 may verify the output after it is revealed at 460. In some examples, the verifier node 405 may verify the output based on verifying the regenerated zero-knowledge proof. For example, the verifier node 405 may verify each step of the zero-knowledge proof. In some examples, the verifier node 405 may reject the zero-knowledge proof based on determining that a step of the zero-knowledge proof is invalid.

In some examples, the verifier node 405 may verify a result of the cryptographic operation based on verifying execution of the zero-knowledge proof by a threshold quantity of MPC nodes including the prover node. For example, the verifier node 405 may verify the result according to a TSS where the verifier node 405 may verify t of n MPC nodes in order to verify the cryptographic operation.

Figure 5:
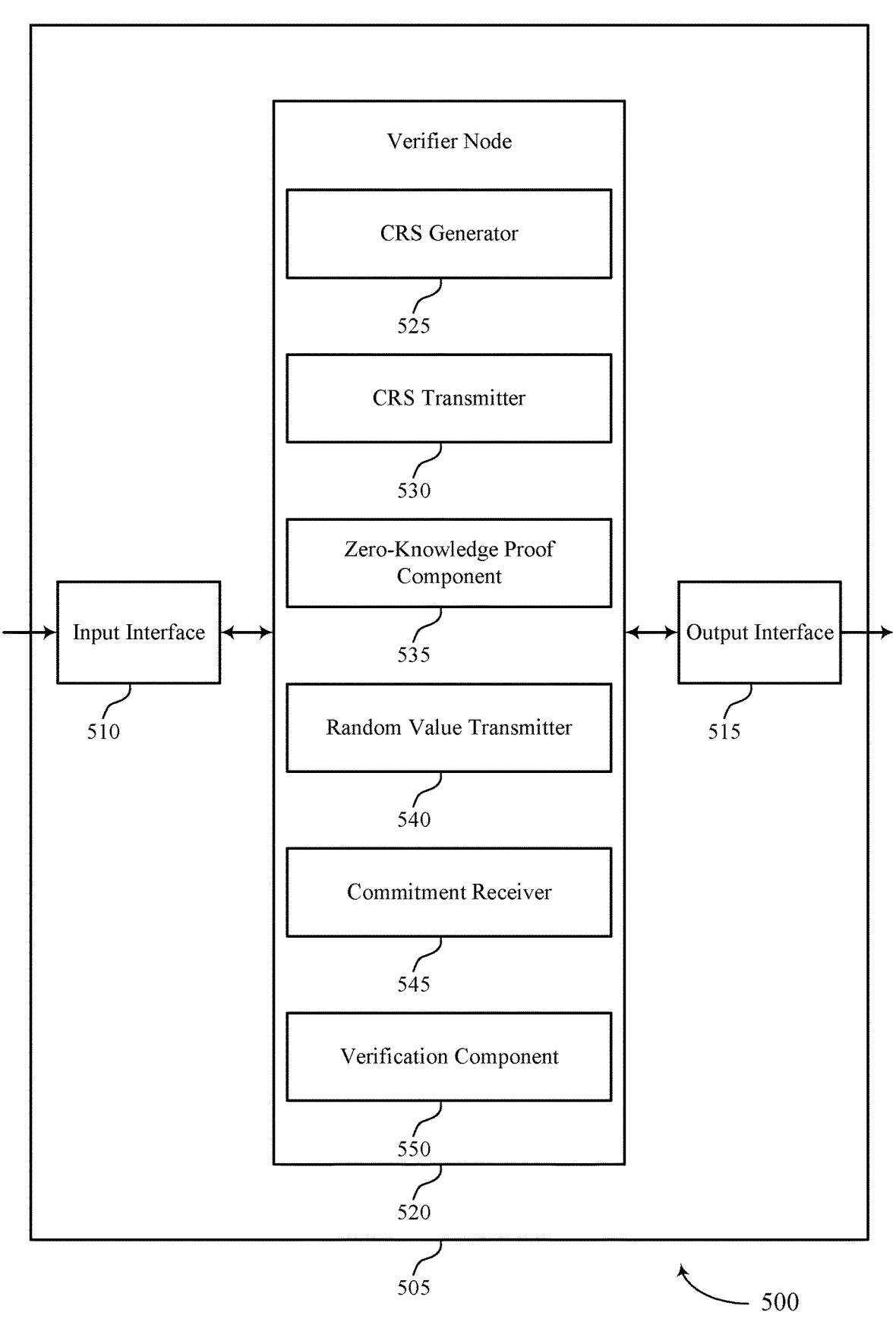
FIG. 5 shows a block diagram of an apparatus that supports verifier generated CRS for zero-knowledge proofs in accordance with aspects of the present disclosure.

FIG. 5 shows a block diagram 500 of a system 505 that supports verifier generated CRS for zero-knowledge proofs in accordance with aspects of the present disclosure. The system 505 may include an input interface 510, an output interface 515, and a verifier node 520. The system 505, or one or more components of the system 505 (e.g., the input interface 510, the output interface 515, and the verifier node 520), may include at least one processor, which may be coupled with at least one memory, to support the described techniques. Each of these components may be in communication with one another (e.g., via one or more buses).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the verifier node 520 to support verifier generated CRS for non-interactive zero-knowledge proofs.

The output interface 515 may manage output signaling for the system 505. For example, the output interface 515 may receive signaling from other components of the system 505, such as the verifier node 520, and may transmit such output signaling corresponding to (e.g., representative of or otherwise based on) such signaling to other systems or devices.

For example, the verifier node 520 may include an CRS generator 525, an CRS transmitter 530, a zero-knowledge proof component 535, a random value transmitter 540, a commitment receiver 545, a verification component 550, or any combination thereof. In some examples, the verifier node 520, or various components thereof, may be configured to perform various operations (e.g., receiving, monitoring, transmitting) using or otherwise in cooperation with the input interface 510, the output interface 515, or both. For example, the verifier node 520 may receive information from the input interface 510, send information to the output interface 515, or be integrated in combination with the input interface 510, the output interface 515, or both to receive information, transmit information, or perform various other operations as described herein.

The verifier node 520 may support management of a cryptographic operation in accordance with examples as disclosed herein. The CRS generator 525 may be configured as or otherwise support a means for generating, at a verifier node, a CRS using a random value. The CRS transmitter 530 may be configured as or otherwise support a means for transmitting, to a prover node, a message comprising the CRS. The zero-knowledge proof component 535 may be configured as or otherwise support a means for receiving, from the prover node, a commitment of an output of a zero-knowledge proof executed by the prover node, the commitment of the output configured to hide the output from the verifier node until the output is revealed to the verifier node. The random value transmitter 540 may be configured as or otherwise support a means for transmitting, after receiving the commitment, the random value that is used for generating the CRS. The commitment receiver 545 may be configured as or otherwise support a means for receiving, from the prover node, an indication that the commitment is revealed. The verification component 550 may be configured as or otherwise support a means for verifying, after receiving the indication that the commitment is revealed, that the output is a valid zero-knowledge proof.

Figure 6:
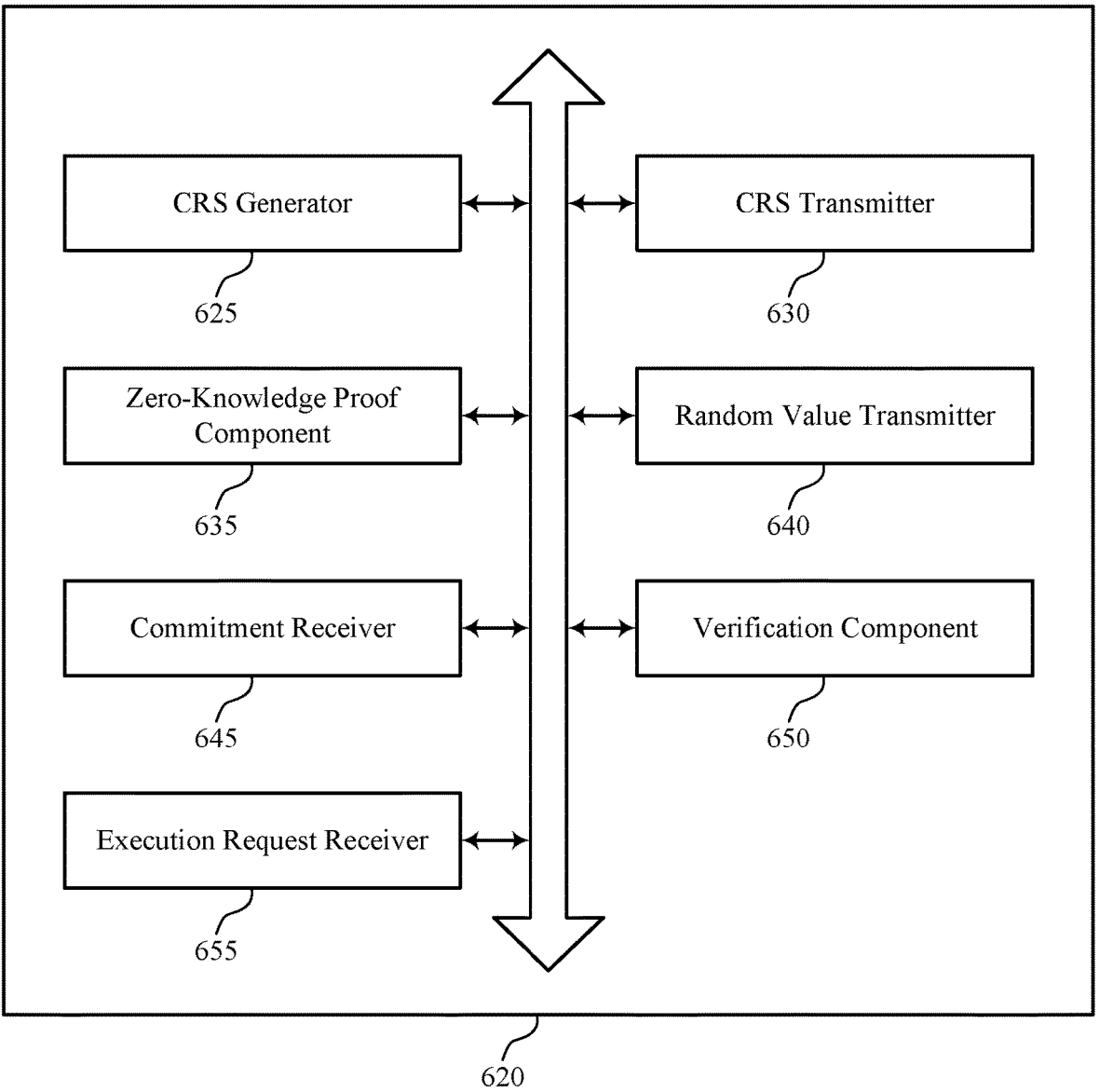
FIG. 6 shows a block diagram of a verifier node that supports verifier generated CRS for zero-knowledge proofs in accordance with aspects of the present disclosure.

FIG. 6 shows a block diagram 600 of a verifier node 620 that supports verifier generated CRS for zero-knowledge proofs in accordance with aspects of the present disclosure. The verifier node 620 may be an example of aspects of a verifier node or a verifier node 20, or both, as described herein. The verifier node 620, or various components thereof, may be an example of means for performing various aspects of verifier generated CRS for zero-knowledge proofs as described herein. For example, the verifier node 620 may include an CRS generator 625, an CRS transmitter 630, a zero-knowledge proof component 635, a random value transmitter 640), a commitment receiver 645, a verification component 650, an execution request receiver 655, or any combination thereof. Each of these components may communicate, directly or indirectly, with one another (e.g., via one or more buses, communications links, communications interfaces, or any combination thereof).

The verifier node 620 may support management of a cryptographic operation in accordance with examples as disclosed herein. The CRS generator 625 may be configured as or otherwise support a means for generating, at a verifier node, a CRS using a random value. The CRS transmitter 630 may be configured as or otherwise support a means for transmitting, to a prover node, a message comprising the CRS. The zero-knowledge proof component 635 may be configured as or otherwise support a means for receiving, from the prover node, a commitment of an output of a zero-knowledge proof executed by the prover node, the commitment of the output configured to hide the output from the verifier node until the output is revealed to the verifier node. The random value transmitter 640 may be configured as or otherwise support a means for transmitting, after receiving the commitment, the random value that is used for generating the CRS. The commitment receiver 645 may be configured as or otherwise support a means for receiving, from the prover node, an indication that the commitment is revealed. The verification component 650 may be configured as or otherwise support a means for verifying, after receiving the indication that the commitment is revealed, that the output is a valid zero-knowledge proof.

In some examples, the execution request receiver 655 may be configured as or otherwise support a means for receiving an execution request to execute the cryptographic operation, wherein the CRS is generated and the message is transmitted in response to receiving the execution request.

In some examples, to support transmitting the message, the CRS transmitter 630 may be configured as or otherwise support a means for transmitting, to a plurality of MPC nodes including the prover node, a request to execute the cryptographic operation, wherein the request includes the CRS.

In some examples, the cryptographic operation is a distributed signature to be executed by a plurality of MPC nodes including the prover node.

In some examples, the verification component 650 may be configured as or otherwise support a means for verifying a result of execution of the cryptographic operation based at least in part on verifying execution of the zero-knowledge proof by a threshold quantity of MPC nodes including the prover node.

In some examples, the output is a result of execution of the zero-knowledge proof by the prover node.

In some examples, the zero-knowledge proof is a non-interactive zero-knowledge proof.

Figure 7:
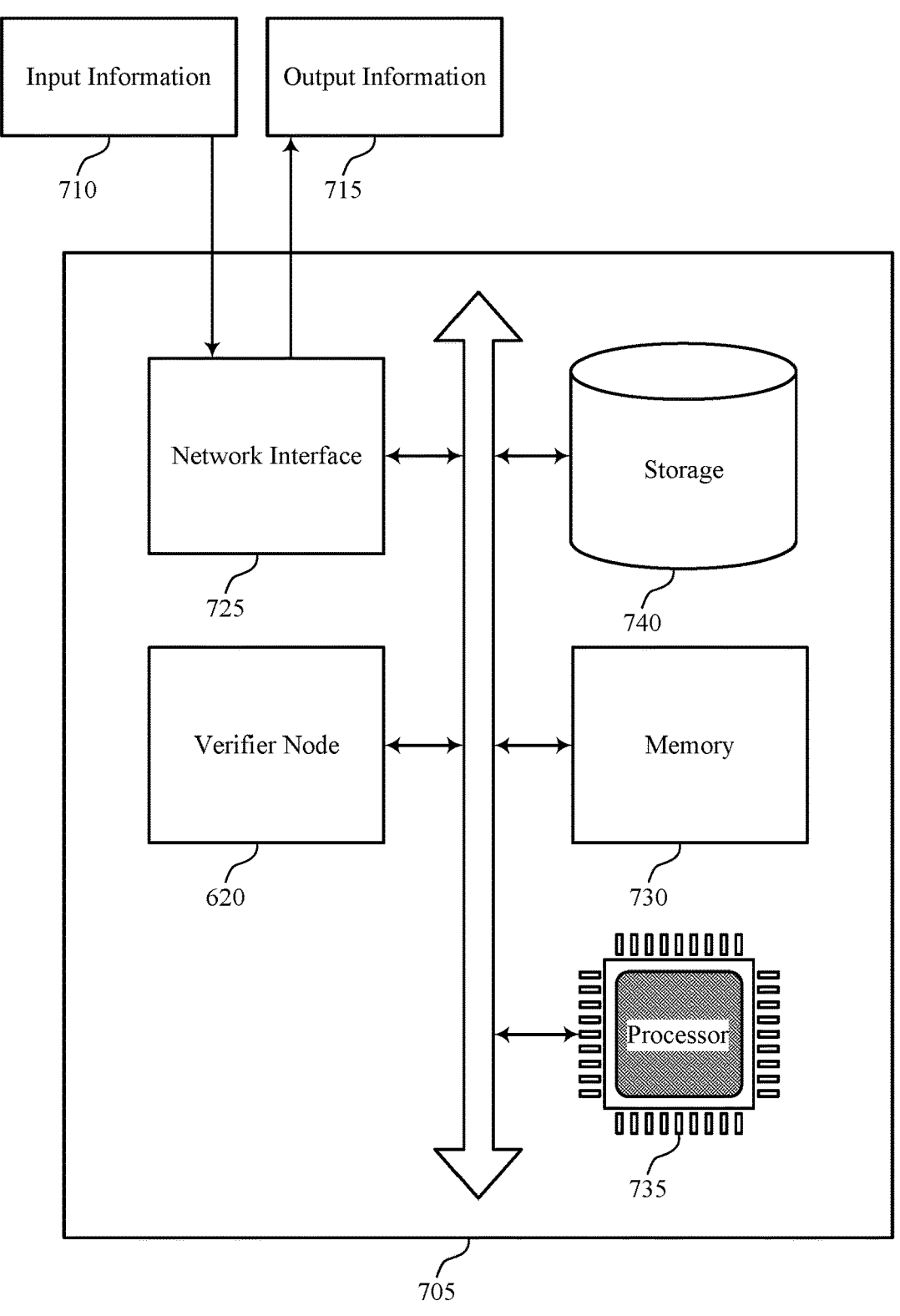
FIG. 7 shows a diagram of a system including a device that supports verifier generated CRS for zero-knowledge proofs in accordance with aspects of the present disclosure.

FIG. 7 shows a diagram of a system 700 including a system 705 that supports verifier generated CRS for zero-knowledge proofs in accordance with aspects of the present disclosure. The system 705 may be an example of or include the components of a system 505 as described herein. The system 705 may include components for non-interactive zero-knowledge proofs, such as a verifier node 720, an input information 710, an output interface 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause at least one processor 735 to perform various functions described herein, such as functions supporting verifier generated CRS for non-interactive zero-knowledge proofs. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1. The memory 730 may be an example of a single memory or multiple memories. For example, the system 705 may include one or more memories 730.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in at least one memory 730 to perform various functions (e.g., functions or tasks supporting verifier generated CRS for non-interactive zero-knowledge proofs). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. The processor 735 may be an example of a single processor or multiple processors. For example, the system 705 may include one or more processors 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1.

The verifier node 720 may support management of a cryptographic operation in accordance with examples as disclosed herein. For example, the verifier node 720 may be configured as or otherwise support a means for generating, at a verifier node, a CRS using a random value. The verifier node 720 may be configured as or otherwise support a means for transmitting, to a prover node, a message comprising the CRS. The verifier node 720 may be configured as or otherwise support a means for receiving, from the prover node, a commitment of an output of a zero-knowledge proof executed by the prover node, the commitment of the output configured to hide the output from the verifier node until the output is revealed to the verifier node. The verifier node 720 may be configured as or otherwise support a means for transmitting, after receiving the commitment, the random value that is used for generating the CRS. The verifier node 720 may be configured as or otherwise support a means for receiving, from the prover node, an indication that the commitment is revealed. The verifier node 720 may be configured as or otherwise support a means for verifying, after receiving the indication that the commitment is revealed, that the output is a valid zero-knowledge proof.

By including or configuring the verifier node 720 in accordance with examples as described herein, the system 705 may support techniques for improved security related to cryptographic operations.

Figure 8:
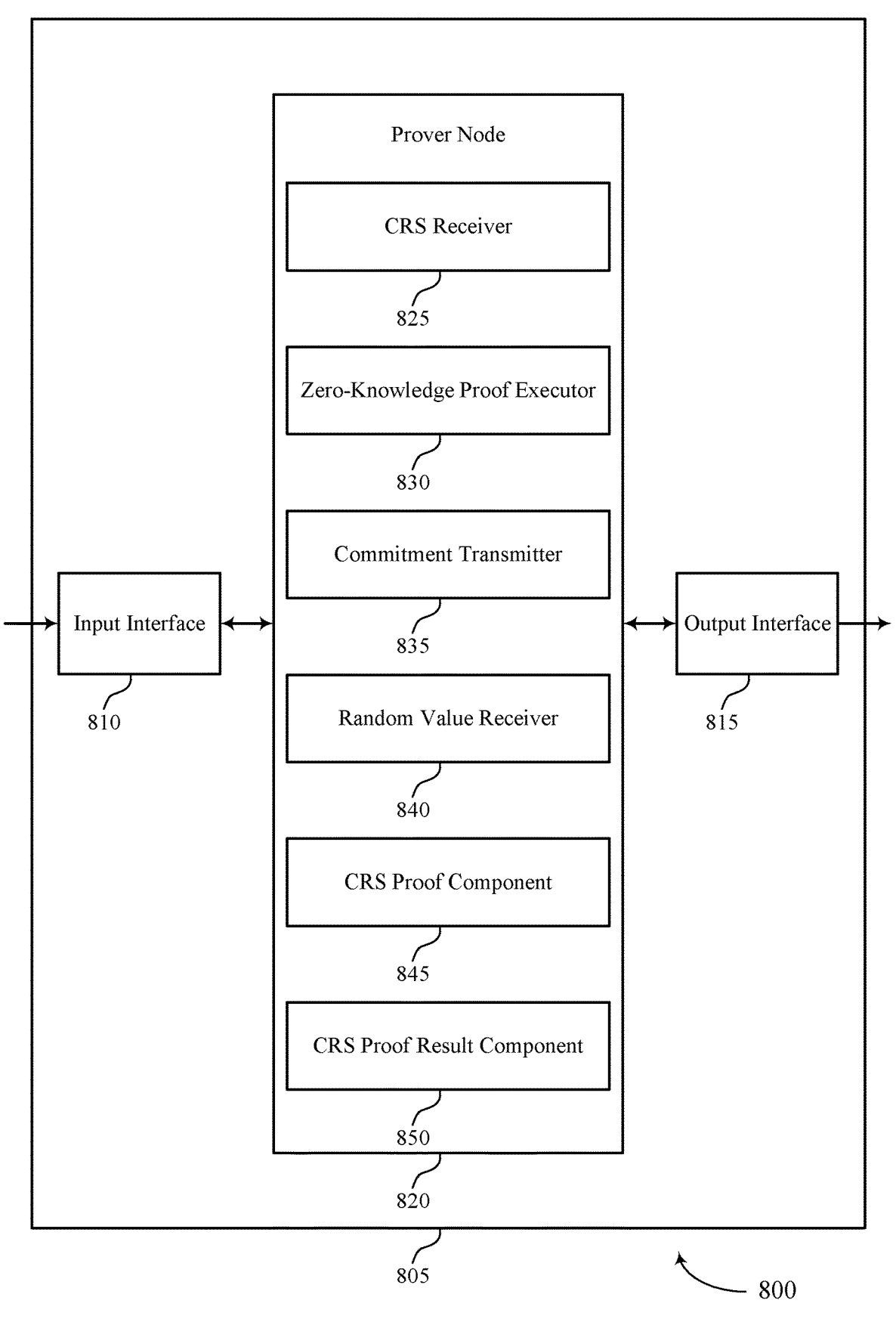
FIG. 8 shows a block diagram of an apparatus that supports verifier generated CRS for zero-knowledge proofs in accordance with aspects of the present disclosure.

FIG. 8 shows a block diagram 800 of a system 805 that supports verifier generated CRS for zero-knowledge proofs in accordance with aspects of the present disclosure. The system 805 may include an input interface 810, an output interface 815, and a prover node 820. The system 805, or one or more components of the system 805 (e.g., the input interface 810, the output interface 715, and the prover node 820), may include at least one processor, which may be coupled with at least one memory, to support the described techniques. Each of these components may communicate, directly or indirectly, with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, transactions, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the prover node 820 to support verifier generated CRS for non-interactive zero-knowledge proofs.

The output interface 815 may manage output signaling for the system 805. For example, the output interface 815 may receive signaling from other components of the system 805, such as the prover node 820, and may transmit such output signaling corresponding to (e.g., representative of or otherwise based on) such signaling to other systems or devices.

For example, the prover node 820 may include an CRS receiver 825, a zero-knowledge proof executor 830, a commitment transmitter 835, a random value receiver 840, an CRS proof component 845, an CRS proof result component 850, or any combination thereof. In some examples, the prover node 820), or various components thereof, may be configured to perform various operations (e.g., receiving, monitoring, transmitting) using or otherwise in cooperation with the input interface 810, the output interface 815, or both. For example, the prover node 820 may receive information from the input interface 810, send information to the output interface 815, or be integrated in combination with the input interface 810, the output interface 815, or both to receive information, transmit information, or perform various other operations as described herein.

The prover node 820 may support performing a cryptographic operation in accordance with examples as disclosed herein. The CRS receiver 825 may be configured as or otherwise support a means for receiving, from a verifier node and at a prover node, a message comprising a CRS. The zero-knowledge proof executor 830 may be configured as or otherwise support a means for executing a zero-knowledge proof using the CRS. The commitment transmitter 835 may be configured as or otherwise support a means for transmitting, to the verifier node, a commitment of an output of the zero-knowledge proof, the commitment of the output configured to hide the output from the verifier node until the output is revealed to the verifier node. The random value receiver 840 may be configured as or otherwise support a means for receiving, after transmitting the commitment and from the verifier node, a random value associated with the CRS. The CRS proof component 845 may be configured as or otherwise support a means for determining whether the CRS is generated using the random value received from the verifier node. The CRS proof result component 850) may be configured as or otherwise support a means for aborting the cryptographic operation or revealing the commitment based at least in part on a result of the determining.

Figure 9:
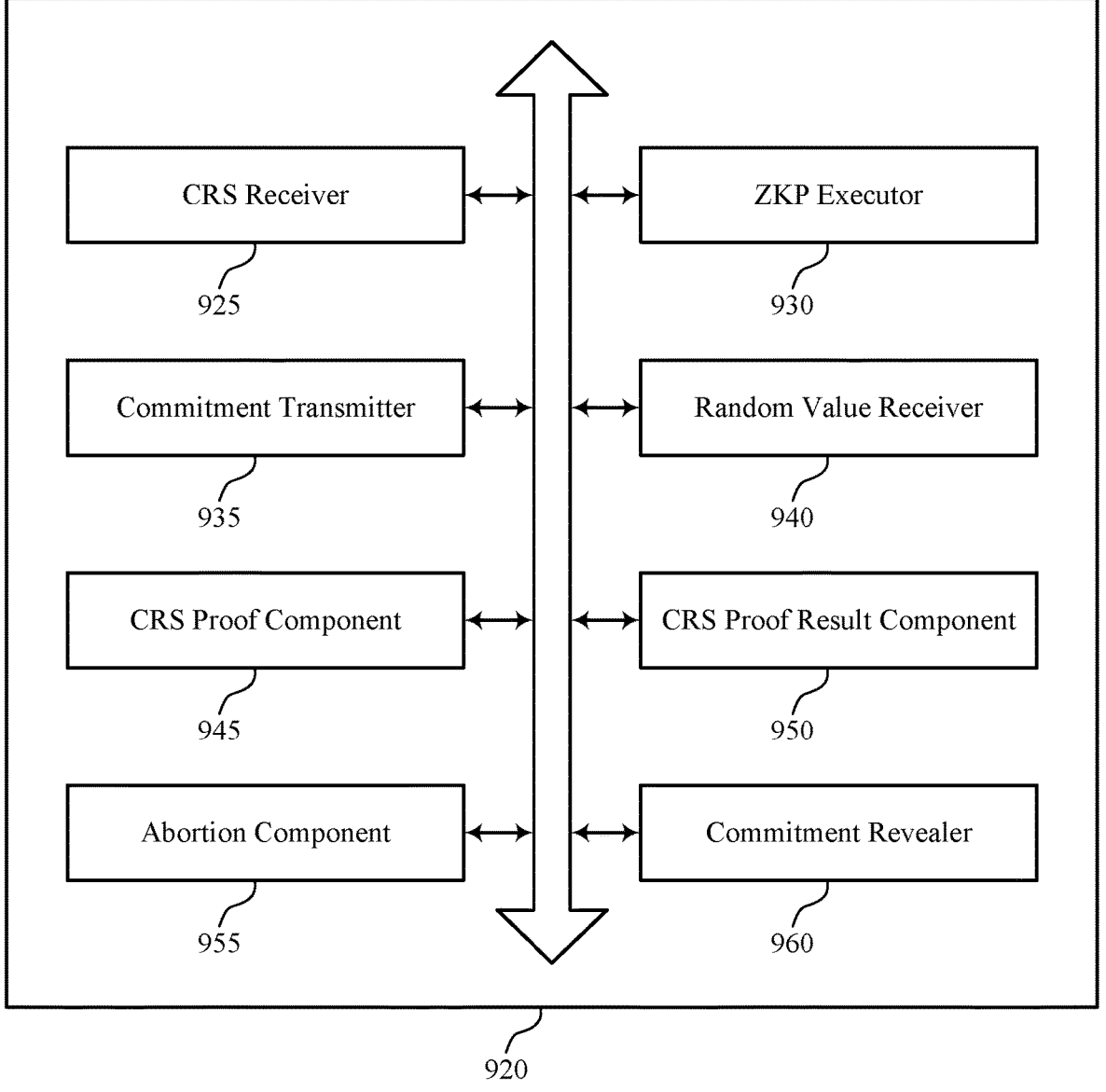
FIG. 9 shows a block diagram of a prover node that supports verifier generated CRS for zero-knowledge proofs in accordance with aspects of the present disclosure.

FIG. 9 shows a block diagram 900 of a prover node 920 that supports verifier generated CRS for zero-knowledge proofs in accordance with aspects of the present disclosure. The prover node 920 may be an example of aspects of a prover node or a prover node 820, or both, as described herein. The prover node 920, or various components thereof, may be an example of means for performing various aspects of verifier generated CRS for zero-knowledge proofs as described herein. For example, the prover node 920 may include an CRS receiver 925, a zero-knowledge proof executor 930, a commitment transmitter 935, a random value receiver 940, an CRS proof component 945, an CRS proof result component 950, an abortion component 955, a commitment revealer 960, or any combination thereof. Each of these components, or components of subcomponents thereof (e.g., one or more processors, one or more memories), may communicate, directly or indirectly, with one another (e.g., via one or more buses).

The prover node 920 may support performing a cryptographic operation in accordance with examples as disclosed herein. The CRS receiver 925 may be configured as or otherwise support a means for receiving, from a verifier node and at a prover node, a message comprising a CRS. The zero-knowledge proof executor 930 may be configured as or otherwise support a means for executing a zero-knowledge proof using the CRS. The commitment transmitter 935 may be configured as or otherwise support a means for transmitting, to the verifier node, a commitment of an output of the zero-knowledge proof, the commitment of the output configured to hide the output from the verifier node until the output is revealed to the verifier node. The random value receiver 940 may be configured as or otherwise support a means for receiving, after transmitting the commitment and from the verifier node, a random value associated with the CRS. The CRS proof component 945 may be configured as or otherwise support a means for determining whether the CRS is generated using the random value received from the verifier node. The CRS proof result component 950 may be configured as or otherwise support a means for aborting the cryptographic operation or revealing the commitment based at least in part on a result of the determining.

In some examples, the abortion component 955 may be configured as or otherwise support a means for aborting the cryptographic operation based at least part on determining that the random value results in a value other than the CRS.

In some examples, the commitment revealer 960 may be configured as or otherwise support a means for revealing the commitment for the verifier node based at least in part on determining that the CRS is generated using the random value.

In some examples, to support transmitting the commitment, the zero-knowledge proof executor 930 may be configured as or otherwise support a means for committing, as the output, a result of execution of the zero-knowledge proof.

In some examples, the prover node is MPC node and the cryptographic operation is a distributed signature to be executed by a plurality of MPC nodes including the prover node.

In some examples, the distributed signature comprises a threshold quantity of partial signatures by the plurality of MPC nodes.

In some examples, to support executing the zero-knowledge proof, the zero-knowledge proof executor 930 may be configured as or otherwise support a means for executing a partial signature using a key share associated with the prover node.

In some examples, the zero-knowledge proof is a non-interactive zero-knowledge proof.

Figure 10:
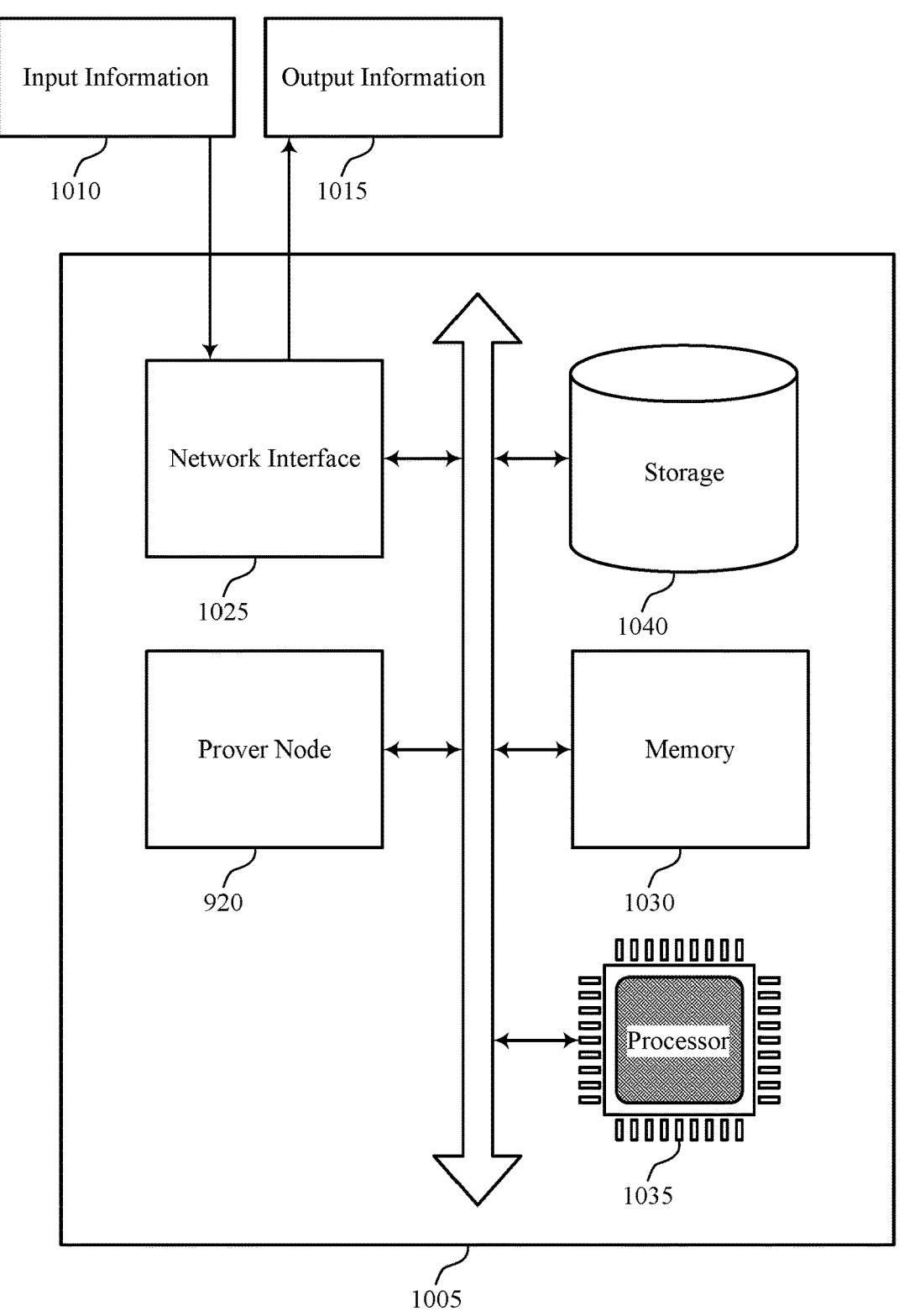
FIG. 10 shows a diagram of a system including a device that supports verifier generated CRS for zero-knowledge proofs in accordance with aspects of the present disclosure.

FIG. 10 shows a diagram of a system 1000 including a system 1005 that supports verifier generated CRS for zero-knowledge proofs in accordance with aspects of the present disclosure. The system 1005 may be an example of or include the components of a system 805 as described herein. The system 1005 may include components for non-interactive zero-knowledge proofs, such as a prover node 920, an input information 1010, an output information 1015, a network interface 1025, at least one memory 1030, at least one processor 1035, and a storage 1040. Each of these components may communicate, directly or indirectly, with one another (e.g., via one or more buses, communications links, communications interfaces, or any combination thereof).

The network interface 1025 may enable the system 1005 to exchange information (e.g., input information 1010, output information 1015, or both) with other systems or devices (not shown). For example, the network interface 1025 may enable the system 1005 to connect to a network (e.g., a network 135 as described herein). The network interface 1025 may include one or more wireless network interfaces, one or more wired network interfaces, or any combination thereof.

Memory 1030 may include RAM, ROM, or both. The memory 1030 may store computer-readable, computer-executable software including instructions that, when executed, cause at least one processor 1035 to perform various functions described herein, such as functions supporting verifier generated CRS for non-interactive zero-knowledge proofs. In some cases, the memory 1030 may contain, among other things, a basic input/output system (BIOS), which may control basic hardware or software operation such as the interaction with peripheral components or devices. In some cases, the memory 1030 may be an example of aspects of one or more components of a custodial token platform 110 as described with reference to FIG. 1. The memory 1030 may be an example of a single memory or multiple memories. For example, the system 1005 may include one or more memories 1030.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in at least one memory 1030 to perform various functions (e.g., functions or tasks supporting verifier generated CRS for non-interactive zero-knowledge proofs). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. The processor 1035 may be an example of a single processor or multiple processors. For example, the system 1005 may include one or more processors 1035.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1.

The prover node 1020 may support performing a cryptographic operation in accordance with examples as disclosed herein. For example, the prover node 1020 may be configured as or otherwise support a means for receiving, from a verifier node and at a prover node, a message comprising a CRS. The prover node 1020 may be configured as or otherwise support a means for executing a zero-knowledge proof using the CRS. The prover node 1020 may be configured as or otherwise support a means for transmitting, to the verifier node, a commitment of an output of the zero-knowledge proof, the commitment of the output configured to hide the output from the verifier node until the output is revealed to the verifier node. The prover node 1020 may be configured as or otherwise support a means for receiving, after transmitting the commitment and from the verifier node, a random value associated with the CRS. The prover node 1020 may be configured as or otherwise support a means for determining whether the CRS is generated using the random value received from the verifier node. The prover node 1020 may be configured as or otherwise support a means for aborting the cryptographic operation or revealing the commitment based at least in part on a result of the determining.

By including or configuring the prover node 1020 in accordance with examples as described herein, the system 1005 may support techniques for improved security for cryptographic transactions.

FIG. 11 shows a flowchart illustrating a method 1100 that supports verifier generated CRS for zero-knowledge proofs in accordance with aspects of the present disclosure. The operations of the method 1100 may be implemented by a verifier node or its components as described herein. For example, the operations of the method 1100 may be performed by a verifier node as described with reference to FIGS. 1 through 6. In some examples, a verifier node may execute a set of instructions to control the functional elements of the verifier node to perform the described functions. Additionally, or alternatively, the verifier node may perform aspects of the described functions using special-purpose hardware.

At 1105, the method may include generating, at a verifier node, a CRS using a random value. The operations of block 1105 may be performed in accordance with examples as disclosed herein. In some examples, aspects of the operations of 1105 may be performed by an CRS generator 625 as described with reference to FIG. 6.

At 1110, the method may include transmitting, to a prover node, a message comprising the CRS. The operations of block 1110 may be performed in accordance with examples as disclosed herein. In some examples, aspects of the operations of 1110 may be performed by an CRS transmitter 630 as described with reference to FIG. 6.

At 1115, the method may include receiving, from the prover node, a commitment of an output of a zero-knowledge proof executed by the prover node, the commitment of the output configured to hide the output from the verifier node until the output is revealed to the verifier node. The operations of block 1115 may be performed in accordance with examples as disclosed herein. In some examples, aspects of the operations of 1115 may be performed by a zero-knowledge proof component 635 as described with reference to FIG. 6.

At 1120, the method may include transmitting, after receiving the commitment, the random value that is used for generating the CRS. The operations of block 1120 may be performed in accordance with examples as disclosed herein. In some examples, aspects of the operations of 1120 may be performed by a random value transmitter 640 as described with reference to FIG. 6.

At 1125, the method may include receiving, from the prover node, an indication that the commitment is revealed. The operations of block 1125 may be performed in accordance with examples as disclosed herein. In some examples, aspects of the operations of 1125 may be performed by a commitment receiver 645 as described with reference to FIG. 6.

At 1130, the method may include verifying, after receiving the indication that the commitment is revealed, that the output is a valid zero-knowledge proof. The operations of block 1130 may be performed in accordance with examples as disclosed herein. In some examples, aspects of the operations of 1130 may be performed by a verification component 650 as described with reference to FIG. 6.

FIG. 12 shows a flowchart illustrating a method 1200 that supports verifier generated CRS for zero-knowledge proofs in accordance with aspects of the present disclosure. The operations of the method 1200 may be implemented by a verifier node or its components as described herein. For example, the operations of the method 1200 may be performed by a verifier node as described with reference to FIGS. 1 through 6. In some examples, a verifier node may execute a set of instructions to control the functional elements of the verifier node to perform the described functions. Additionally, or alternatively, the verifier node may perform aspects of the described functions using special-purpose hardware.

At 1205, the method may include receiving an execution request to execute the cryptographic operation, wherein the CRS is generated and the message is transmitted in response to receiving the execution request. The operations of block 1205 may be performed in accordance with examples as disclosed herein. In some examples, aspects of the operations of 1205 may be performed by an execution request receiver 655 as described with reference to FIG. 6.

At 1210, the method may include generating, at a verifier node, a CRS using a random value. The operations of block 1210 may be performed in accordance with examples as disclosed herein. In some examples, aspects of the operations of 1210 may be performed by an CRS generator 625 as described with reference to FIG. 6.

At 1215, the method may include transmitting, to a prover node, a message comprising the CRS. The operations of block 1215 may be performed in accordance with examples as disclosed herein. In some examples, aspects of the operations of 1215 may be performed by an CRS transmitter 630 as described with reference to FIG. 6.

At 1220, the method may include receiving, from the prover node, a commitment of an output of a zero-knowledge proof executed by the prover node, the commitment of the output configured to hide the output from the verifier node until the output is revealed to the verifier node. The operations of block 1220 may be performed in accordance with examples as disclosed herein. In some examples, aspects of the operations of 1220 may be performed by a zero-knowledge proof component 635 as described with reference to FIG. 6.

At 1225, the method may include transmitting, after receiving the commitment, the random value that is used for generating the CRS. The operations of block 1225 may be performed in accordance with examples as disclosed herein. In some examples, aspects of the operations of 1225 may be performed by a random value transmitter 640 as described with reference to FIG. 6.

At 1230, the method may include receiving, from the prover node, an indication that the commitment is revealed. The operations of block 1230 may be performed in accordance with examples as disclosed herein. In some examples, aspects of the operations of 1230 may be performed by a commitment receiver 645 as described with reference to FIG. 6.

At 1235, the method may include verifying, after receiving the indication that the commitment is revealed, that the output is a valid zero-knowledge proof. The operations of block 1235 may be performed in accordance with examples as disclosed herein. In some examples, aspects of the operations of 1235 may be performed by a verification component 650 as described with reference to FIG. 5.

Figure 13:
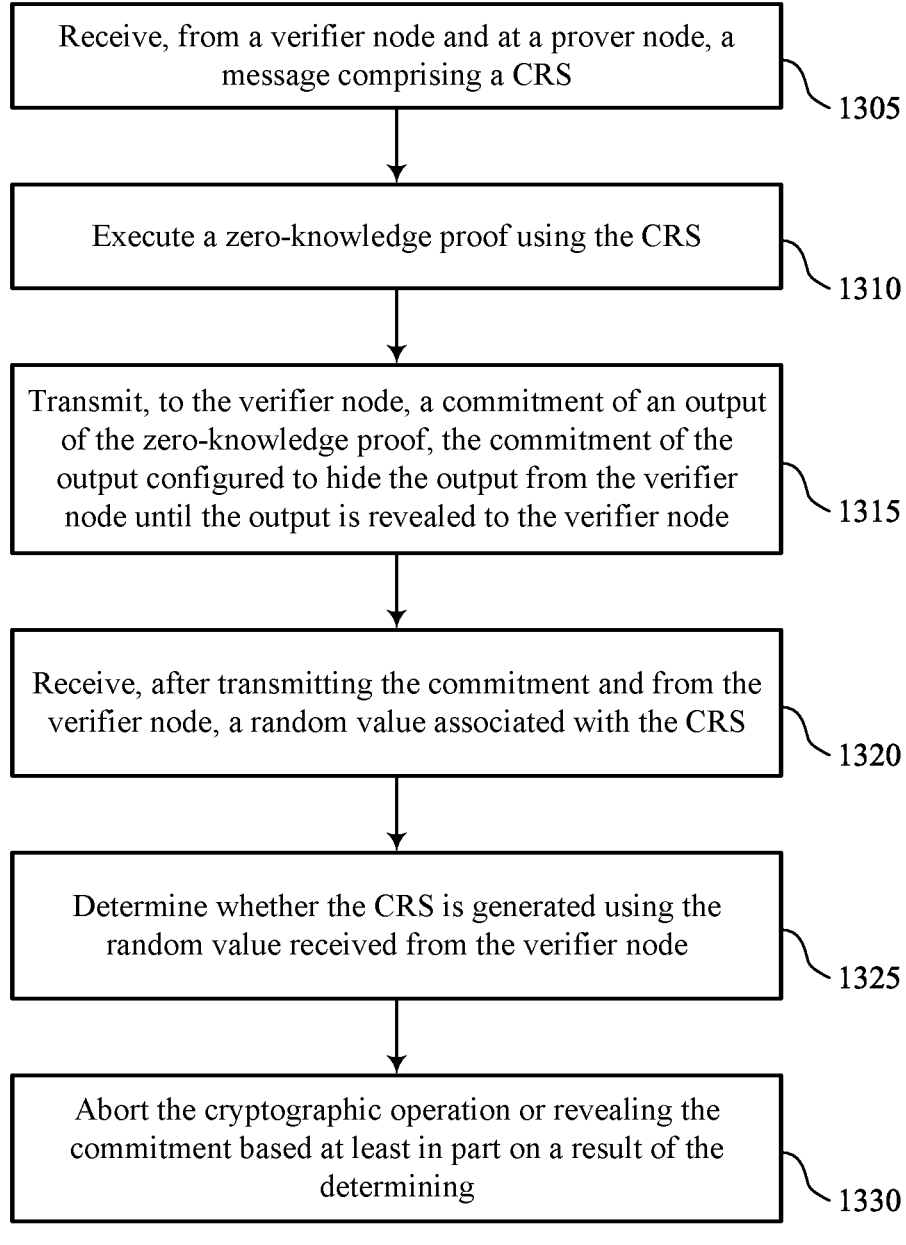

FIG. 13 shows a flowchart illustrating a method 1300 that supports verifier generated CRS for zero-knowledge proofs in accordance with aspects of the present disclosure. The operations of the method 1300 may be implemented by a prover node or its components as described herein. For example, the operations of the method 1300 may be performed by a prover node as described with reference to FIGS. 1 through 3 and 7 through 9. In some examples, a prover node may execute a set of instructions to control the functional elements of the prover node to perform the described functions. Additionally, or alternatively, the prover node may perform aspects of the described functions using special-purpose hardware.

At 1305, the method may include receiving, from a verifier node and at a prover node, a message comprising a CRS. The operations of block 1305 may be performed in accordance with examples as disclosed herein. In some examples, aspects of the operations of 1305 may be performed by an CRS receiver 825 as described with reference to FIG. 8.

At 1310, the method may include executing a zero-knowledge proof using the CRS. The operations of block 1310 may be performed in accordance with examples as disclosed herein. In some examples, aspects of the operations of 1310 may be performed by a zero-knowledge proof executor 830 as described with reference to FIG. 8.

At 1315, the method may include transmitting, to the verifier node, a commitment of an output of the zero-knowledge proof, the commitment of the output configured to hide the output from the verifier node until the output is revealed to the verifier node. The operations of block 1315 may be performed in accordance with examples as disclosed herein. In some examples, aspects of the operations of 1315 may be performed by a commitment transmitter 835 as described with reference to FIG. 8.

At 1320, the method may include receiving, after transmitting the commitment and from the verifier node, a random value associated with the CRS. The operations of block 1320 may be performed in accordance with examples as disclosed herein. In some examples, aspects of the operations of 1320 may be performed by a random value receiver 840 as described with reference to FIG. 8.

At 1325, the method may include determining whether the CRS is generated using the random value received from the verifier node. The operations of block 1325 may be performed in accordance with examples as disclosed herein. In some examples, aspects of the operations of 1325 may be performed by an CRS proof component 845 as described with reference to FIG. 8.

At 1330, the method may include aborting the cryptographic operation or revealing the commitment based at least in part on a result of the determining. The operations of block 1330 may be performed in accordance with examples as disclosed herein. In some examples, aspects of the operations of 1330 may be performed by an CRS proof result component 850) as described with reference to FIG. 8.

A method for management of a cryptographic operation by an apparatus is described. The method may include generating, at a verifier node, a CRS using a random value, transmitting, to a prover node, a message comprising the CRS, receiving, from the prover node, a commitment of an output of a zero-knowledge proof executed by the prover node, the commitment of the output configured to hide the output from the verifier node until the output is revealed to the verifier node, transmitting, after receiving the commitment, the random value that is used for generating the CRS, receiving, from the prover node, an indication that the commitment is revealed, and verifying, after receiving the indication that the commitment is revealed, that the output is a valid zero-knowledge proof.

An apparatus for management of a cryptographic operation is described. The apparatus may include one or more memories storing processor executable code, and one or more processors coupled with the one or more memories. The one or more processors may individually or collectively operable to execute the code to cause the apparatus to generate, at a verifier node, a CRS using a random value, transmit, to a prover node, a message comprising the CRS, receive, from the prover node, a commitment of an output of a zero-knowledge proof executed by the prover node, the commitment of the output configured to hide the output from the verifier node until the output is revealed to the verifier node, transmit, after receiving the commitment, the random value that is used for generating the CRS, receive, from the prover node, an indication that the commitment is revealed, and verify, after receiving the indication that the commitment is revealed, that the output is a valid zero-knowledge proof.

Another apparatus for management of a cryptographic operation is described. The apparatus may include means for generating, at a verifier node, a CRS using a random value, means for transmitting, to a prover node, a message comprising the CRS, means for receiving, from the prover node, a commitment of an output of a zero-knowledge proof executed by the prover node, the commitment of the output configured to hide the output from the verifier node until the output is revealed to the verifier node, means for transmitting, after receiving the commitment, the random value that is used for generating the CRS, means for receiving, from the prover node, an indication that the commitment is revealed, and means for verifying, after receiving the indication that the commitment is revealed, that the output is a valid zero-knowledge proof.

A non-transitory computer-readable medium storing code for management of a cryptographic operation is described. The code may include instructions executable by a processor to generate, at a verifier node, a CRS using a random value, transmit, to a prover node, a message comprising the CRS, receive, from the prover node, a commitment of an output of a zero-knowledge proof executed by the prover node, the commitment of the output configured to hide the output from the verifier node until the output is revealed to the verifier node, transmit, after receiving the commitment, the random value that is used for generating the CRS, receive, from the prover node, an indication that the commitment is revealed, and verify, after receiving the indication that the commitment is revealed, that the output is a valid zero-knowledge proof.

Some examples of the method, apparatus, and non-transitory computer-readable medium described herein may further include operations, features, means, or instructions for receiving an execution request to execute the cryptographic operation, wherein the CRS may be generated and the message may be transmitted in response to receiving the execution request.

In some examples of the method, apparatus, and non-transitory computer-readable medium described herein, transmitting the message may include operations, features, means, or instructions for transmitting, to a plurality of MPC nodes including the prover node, a request to execute the cryptographic operation, wherein the request includes the CRS.

In some examples of the method, apparatus, and non-transitory computer-readable medium described herein, the cryptographic operation may be a distributed signature to be executed by a plurality of MPC nodes including the prover node.

Some examples of the method, apparatus, and non-transitory computer-readable medium described herein may further include operations, features, means, or instructions for verifying a result of execution of the cryptographic operation based at least in part on verifying execution of the zero-knowledge proof by a threshold quantity of MPC nodes including the prover node.

In some examples of the method, apparatus, and non-transitory computer-readable medium described herein, the output may be a result of execution of the zero-knowledge proof by the prover node.

In some examples of the method, apparatus, and non-transitory computer-readable medium described herein, the zero-knowledge proof may be a non-interactive zero-knowledge proof.

A method for performing a cryptographic operation by an apparatus is described. The method may include receiving, from a verifier node and at a prover node, a message comprising a CRS, executing a zero-knowledge proof using the CRS, transmitting, to the verifier node, a commitment of an output of the zero-knowledge proof, the commitment of the output configured to hide the output from the verifier node until the output is revealed to the verifier node, receiving, after transmitting the commitment and from the verifier node, a random value associated with the CRS, determining whether the CRS is generated using the random value received from the verifier node, and aborting the cryptographic operation or revealing the commitment based at least in part on a result of the determining.

An apparatus for performing a cryptographic operation is described. The apparatus may include one or more memories storing processor executable code, and one or more processors coupled with the one or more memories. The one or more processors may individually or collectively operable to execute the code to cause the apparatus to receive, from a verifier node and at a prover node, a message comprising a CRS, execute a zero-knowledge proof using the CRS, transmit, to the verifier node, a commitment of an output of the zero-knowledge proof, the commitment of the output configured to hide the output from the verifier node until the output is revealed to the verifier node, receive, after transmitting the commitment and from the verifier node, a random value associated with the CRS, determine whether the CRS is generated using the random value received from the verifier node, and abort the cryptographic operation or revealing the commitment based at least in part on a result of the determining.

Another apparatus for performing a cryptographic operation is described. The apparatus may include means for receiving, from a verifier node and at a prover node, a message comprising a CRS, means for executing a zero-knowledge proof using the CRS, means for transmitting, to the verifier node, a commitment of an output of the zero-knowledge proof, the commitment of the output configured to hide the output from the verifier node until the output is revealed to the verifier node, means for receiving, after transmitting the commitment and from the verifier node, a random value associated with the CRS, means for determining whether the CRS is generated using the random value received from the verifier node, and means for aborting the cryptographic operation or revealing the commitment based at least in part on a result of the determining.

A non-transitory computer-readable medium storing code for performing a cryptographic operation is described. The code may include instructions executable by a processor to receive, from a verifier node and at a prover node, a message comprising a CRS, execute a zero-knowledge proof using the CRS, transmit, to the verifier node, a commitment of an output of the zero-knowledge proof, the commitment of the output configured to hide the output from the verifier node until the output is revealed to the verifier node, receive, after transmitting the commitment and from the verifier node, a random value associated with the CRS, determine whether the CRS is generated using the random value received from the verifier node, and abort the cryptographic operation or revealing the commitment based at least in part on a result of the determining.

Some examples of the method, apparatus, and non-transitory computer-readable medium described herein may further include operations, features, means, or instructions for aborting the cryptographic operation based at least part on determining that the random value results in a value other than the CRS.

Some examples of the method, apparatus, and non-transitory computer-readable medium described herein may further include operations, features, means, or instructions for revealing the commitment for the verifier node based at least in part on determining that the CRS may be generated using the random value.

In some examples of the method, apparatus, and non-transitory computer-readable medium described herein, transmitting the commitment may include operations, features, means, or instructions for committing, as the output, a result of execution of the zero-knowledge proof.

In some examples of the method, apparatus, and non-transitory computer-readable medium described herein, the prover node may be MPC node and the cryptographic operation may be a distributed signature to be executed by a plurality of MPC nodes including the prover node.

In some examples of the method, apparatus, and non-transitory computer-readable medium described herein, the distributed signature comprises a threshold quantity of partial signatures by the plurality of MPC nodes.

In some examples of the method, apparatus, and non-transitory computer-readable medium described herein, executing the zero-knowledge proof may include operations, features, means, or instructions for executing a partial signature using a key share associated with the prover node.

In some examples of the method, apparatus, and non-transitory computer-readable medium described herein, the zero-knowledge proof may be a non-interactive zero-knowledge proof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components." and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for management of a cryptographic operation, comprising:
   generating, at a verifier node, a common reference string using a random value;
   transmitting, to a prover node, a message comprising the common reference string;
   receiving, from the prover node, a commitment of an output of a zero-knowledge proof executed by the prover node, the commitment of the output configured to hide the output from the verifier node until the output is revealed to the verifier node;
   transmitting, after receiving the commitment, the random value that is used for generating the common reference string;
   receiving, from the prover node, an indication that the commitment is revealed; and
   verifying, after receiving the indication that the commitment is revealed, that the output is a valid zero-knowledge proof.

2. The method of claim 1, further comprising:
   receiving an execution request to execute the cryptographic operation, wherein the common reference string is generated and the message is transmitted in response to receiving the execution request.

3. The method of claim 1, wherein transmitting the message comprises:
   transmitting, to a plurality of multi-party computation (MPC) nodes including the prover node, a request to execute the cryptographic operation, wherein the request includes the common reference string.

4. The method of claim 1, wherein the cryptographic operation is a distributed signature to be executed by a plurality of MPC nodes including the prover node.

5. The method of claim 1, further comprising:
   verifying a result of execution of the cryptographic operation based at least in part on verifying execution of the zero-knowledge proof by a threshold quantity of MPC nodes including the prover node.

6. The method of claim 1, wherein the output is a result of execution of the zero-knowledge proof by the prover node.

7. The method of claim 1, wherein the zero-knowledge proof is a non-interactive zero-knowledge proof.

8. A method for performing a cryptographic operation, comprising:
   receiving, from a verifier node and at a prover node, a message comprising a common reference string;
   executing a zero-knowledge proof using the common reference string;
   transmitting, to the verifier node, a commitment of an output of the zero-knowledge proof, the commitment of the output configured to hide the output from the verifier node until the output is revealed to the verifier node;
   receiving, after transmitting the commitment and from the verifier node, a random value associated with the common reference string;
   determining whether the common reference string is generated using the random value received from the verifier node; and
   aborting the cryptographic operation or revealing the commitment based at least in part on a result of the determining.

9. The method of claim 8, further comprising:
   aborting the cryptographic operation based at least part on determining that the random value results in a value other than the common reference string.

10. The method of claim 8, further comprising:
    revealing the commitment for the verifier node based at least in part on determining that the common reference string is generated using the random value.

11. The method of claim 8, wherein transmitting the commitment comprises:
    committing, as the output, a result of execution of the zero-knowledge proof.

12. The method of claim 8, wherein the prover node is multi-party computation (MPC) node and the cryptographic operation is a distributed signature to be executed by a plurality of MPC nodes including the prover node.

13. The method of claim 12, wherein the distributed signature comprises a threshold quantity of partial signatures by the plurality of MPC nodes.

14. The method of claim 8, wherein executing the zero-knowledge proof comprises:
    executing a partial signature using a key share associated with the prover node.

15. The method of claim 8, wherein the zero-knowledge proof is a non-interactive zero-knowledge proof.

16. An apparatus for management of a cryptographic operation, comprising:
    one or more memories storing processor-executable code; and
    one or more processors coupled with the one or more memories and individually or collectively operable to execute the code to cause the apparatus to:

generate, at a verifier node, a common reference string using a random value;

transmit, to a prover node, a message comprising the common reference string:

receive, from the prover node, a commitment of an output of a zero-knowledge proof executed by the prover node, the commitment of the output configured to hide the output from the verifier node until the output is revealed to the verifier node;

transmit, after receiving the commitment, the random value that is used for generating the common reference string;

receive, from the prover node, an indication that the commitment is revealed; and verify, after receiving the indication that the commitment is revealed, that the output is a valid zero-knowledge proof.

17. The apparatus of claim 16, wherein the one or more processors are individually or collectively further operable to execute the code to cause the apparatus to:

receive an execution request to execute the cryptographic operation, wherein the common reference string is generated and the message is transmitted in response to receiving the execution request.

18. The apparatus of claim 16, wherein, to transmit the message, the one or more processors are individually or collectively operable to execute the code to cause the apparatus to:

transmit, to a plurality of multi-party computation (MPC) nodes including the prover node, a request to execute the cryptographic operation, wherein the request includes the common reference string.

19. The apparatus of claim 16, wherein the cryptographic operation is a distributed signature to be executed by a plurality of MPC nodes including the prover node.

20. The apparatus of claim 16, wherein the one or more processors are individually or collectively further operable to execute the code to cause the apparatus to:

verify a result of execution of the cryptographic operation based at least in part on verifying execution of the zero-knowledge proof by a threshold quantity of MPC nodes including the prover node.

\* \* \* \* \*